United States Patent
Lee et al.

(10) Patent No.: US 10,218,836 B2
(45) Date of Patent: Feb. 26, 2019

(54) METHOD FOR PROVIDING SERVICE BASED ON AWARENESS AND AN ELECTRONIC DEVICE THEREOF

(71) Applicant: SAMSUNG ELECTRONICS CO., LTD., Suwon-si, Gyeonggi-do (KR)

(72) Inventors: Wonhee Lee, Seoul (KR); Chan Soo Park, Seoul (KR); Seungbeom Ryu, Suwon-si (KR); Hyunsu Hong, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 128 days.

(21) Appl. No.: 15/042,228

(22) Filed: Feb. 12, 2016

(65) Prior Publication Data
US 2016/0241707 A1  Aug. 18, 2016

(30) Foreign Application Priority Data
Feb. 17, 2015 (KR) ........................ 10-2015-0024316

(51) Int. Cl.
H04W 4/021  (2018.01)
H04M 1/725  (2006.01)

(52) U.S. Cl.
CPC ... H04M 1/72577 (2013.01); H04M 1/72569 (2013.01); H04W 4/021 (2013.01); H04M 1/72572 (2013.01)

(58) Field of Classification Search
CPC ..... H04W 4/025; H04W 4/026; H04W 4/027; H04W 4/008; H04W 4/021; H04W 4/022;
(Continued)

(56) References Cited

U.S. PATENT DOCUMENTS 7,236,858 B2   6/2007  Carpenter et al.
7,791,455 B1*  9/2010  MacLean, III .......... G01S 7/021
                                              340/10.3
(Continued)

FOREIGN PATENT DOCUMENTS

JP    6-188826      7/1994
JP    2011-217120   10/2011

Primary Examiner — Julio R Perez
(74) Attorney, Agent, or Firm — Nixon & Vanderhye, P.C.

(57) ABSTRACT

Various example embodiments of the disclosure relate to an apparatus and method for providing a service based on context information in an electronic device. In this case, a portable electronic apparatus may include a communication module, an air pressure sensor configured to measure air pressure, a processor electrically coupled to the communication module and the air pressure sensor, and a memory electrically coupled to the processor. The memory may store instructions, when executed, for configuring the processor to determine whether the electronic device is located in a first geofence using the communication module, start monitoring of the air pressure by using the air pressure sensor at least in part on the determining that the electronic device is located in the first geofence, deactivate at least one part of the communication module when the monitored air pressure satisfies one or more of a first range and a first change rate, and re-activate the deactivated at least one part of the communication module when the monitored air pressure satisfies one or more of a second range and a second change rate after the at least one part of the communication module is deactivated. Other example embodiments may also be possible.

14 Claims, 35 Drawing Sheets

(58) Field of Classification Search
CPC ............. H04W 4/028; H04W 52/0274; H04W 52/0264; H04W 48/04; H04M 1/72572; H04M 1/72577; H04M 2250/12
See application file for complete search history.

(56) References Cited

U.S. PATENT DOCUMENTS

| | | |
|---|---|---|
| 8,195,108 B2 | 6/2012 | Sheynblat et al. |
| 8,874,129 B2 | 10/2014 | Forutanpour et al. |
| 2003/0148760 A1* | 8/2003 | Takayanagi ........... H04W 88/02 455/420 |
| 2007/0072590 A1* | 3/2007 | Levitan ................. G06Q 10/02 455/414.1 |
| 2009/0117919 A1* | 5/2009 | Hershenson .......... H04W 48/04 455/456.4 |
| 2010/0248662 A1* | 9/2010 | Sheynblat ......... H04W 52/0274 455/127.1 |
| 2010/0267375 A1* | 10/2010 | Lemmon ................. G06F 21/74 455/418 |
| 2010/0279627 A1* | 11/2010 | Bradley ................ H04W 48/04 455/69 |

\* cited by examiner

METHOD FOR PROVIDING SERVICE BASED ON AWARENESS AND AN ELECTRONIC DEVICE THEREOF

CROSS-REFERENCE TO RELATED APPLICATION

This application is based on and claims priority under 35 U.S.C. § 119 to a Korean patent application filed in the Korean Intellectual Property Office on Feb. 17, 2015 and assigned Serial No. 10-2015-0024316, the disclosure of which is incorporated by reference herein in its entirety.

BACKGROUND

1. Field

Various example embodiments of the disclosure relate to an apparatus and method for providing a mode change and/or a service based on sensing data in an electronic device.

2. Description of Related Art

An electronic device may recognize a plane taking-off or landing situation using at least one of an accelerometer and an air pressure sensor. For example, the electronic device may determine that a plane is in a taking-off state when an acceleration greater than or equal to a reference signal is detected using the accelerometer and is maintained for a reference time. The electronic device may determine that the plane is in the taking-off state on the basis of an absolute air pressure value detected using the air pressure sensor.

SUMMARY

An electronic device may determine an event or change in condition, such as, for example, a plane taking-off or landing situation based, for example, an acceleration value detected using an accelerometer. However, there may be a problem in that an acceleration change caused by a user's movement or the like is incorrectly recognized as the plane taking-off or landing situation.

Further, the electronic device may determine the plane taking-off or landing situation based on an absolute air pressure value detected using an air pressure sensor. In this case, since a condition of setting in-flight air pressure is different according to a plane type and an air route of a plane located at various altitudes, a capability of recognizing the plane taking-off or landing may deteriorate.

Various example embodiments of the disclosure may provide an apparatus and method for determining a taking-off, landing, or in-flight state of a plane based on a change pattern of in-flight air pressure measured by an air pressure sensor in an electronic device.

Various example embodiments of the disclosure relate, for example, to an apparatus and method for providing a service on the basis of a pre-determined state corresponding to a change of, for example, in-flight atmospheric pressure in an electronic device.

According to various example embodiments of the disclosure, a portable electronic apparatus may include a communication module comprising communication circuitry, an air pressure sensor configured to measure air pressure, a processor electrically coupled to the communication module and the air pressure sensor, and a memory electrically coupled to the processor. The memory may store instructions which, when executed, configure the processor to operate to determine whether the electronic device is located in a first geofence using the communication module, to start monitoring of the air pressure using the air pressure sensor partially based on determining that the electronic device is located in the first geofence, to deactivate at least one part of the communication module when the monitored air pressure satisfies at least one of a first range and a first change rate, and to re-activate the at least one part of the communication module when the monitored air pressure satisfies at least one of a second range and a second change rate after the at least one part of the communication module is deactivated.

According to various example embodiments of the disclosure, a method of operating a portable electronic apparatus may include determining whether the electronic device is located in a first geofence, starting monitoring of air pressure partially based on determining that the electronic device is located in the first geofence, deactivating at least one part of a communication module of the electronic device when the monitored air pressure satisfies at least one of a first range and a first change rate, and re-activating the at least one part of the communication module when the monitored air pressure satisfies at least one of a second range and a second change rate after the at least one part of the communication module is deactivated.

BRIEF DESCRIPTION OF THE DRAWINGS

The above and other aspects, features and advantages of certain example embodiments of the disclosure will be more apparent from the following detailed description, taken in conjunction with the accompanying drawings, in which like reference numerals refer to like elements, and wherein.

DETAILED DESCRIPTION

Figure 1:
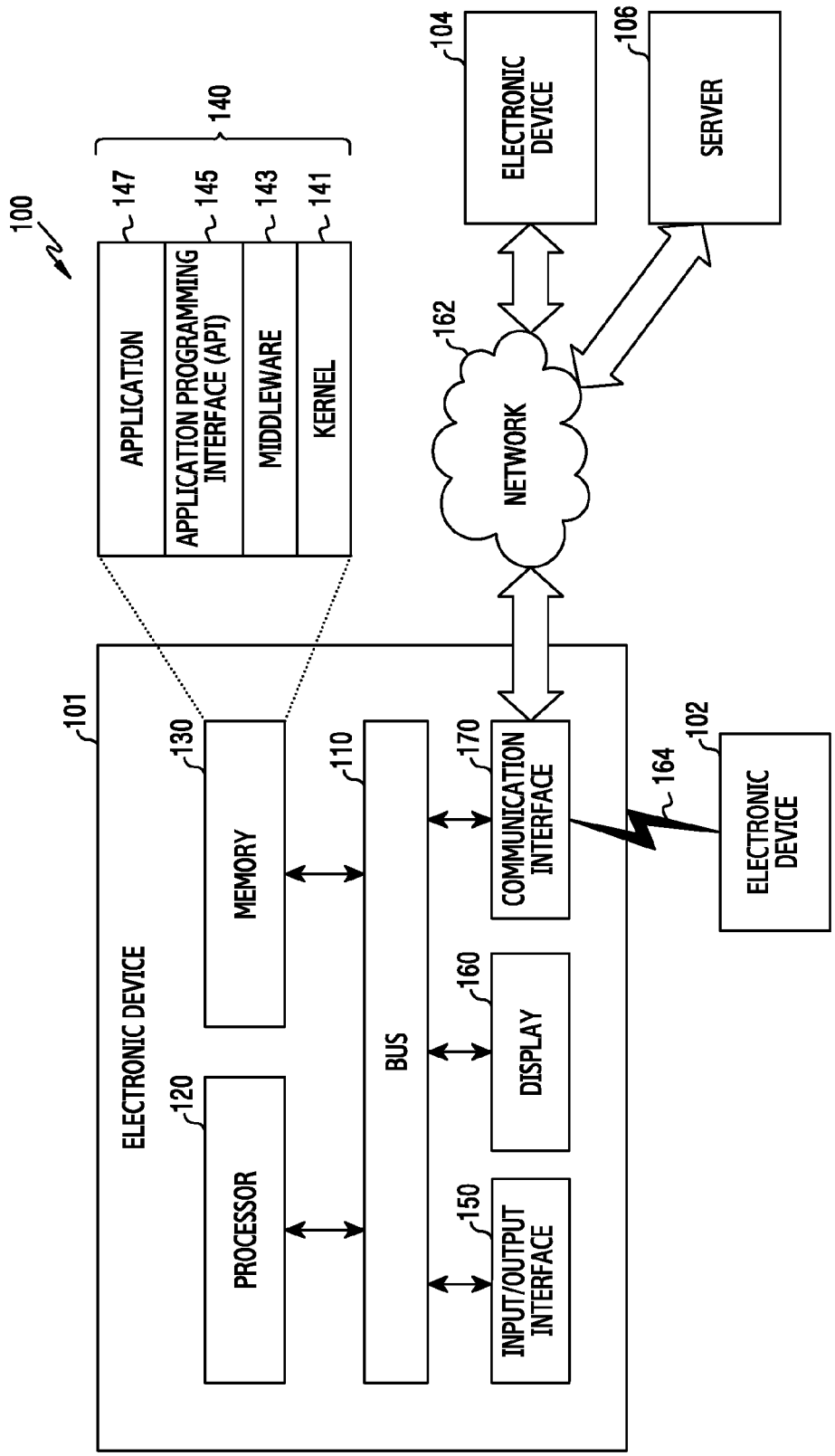
FIG. 1 is a block diagram illustrating an example electronic device in a network environment.

Hereinafter, various example embodiments of the disclosure will be described with reference to the accompanying drawings. In the following description, various example details such as example configurations and components are illustrated to assist the overall understanding of these example embodiments. Therefore, it should be apparent to those skilled in the art that various changes and modifications of the example embodiments described herein can be made without departing from the scope and spirit of the disclosure. In addition, descriptions of well-known functions and constructions may be omitted for clarity and conciseness.

The disclosure may illustrate various example embodiments, and modifications and changes may be made therein. Therefore, the present disclosure will be described in greater detail below with reference to example embodiments illustrated in the accompanying drawings. However, it should be understood that the present disclosure is not limited to the particular illustrated example embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various example embodiments of the present disclosure indicate the presence of disclosed corresponding functions, operations, elements, and the like, and do not limit additional one or more functions, operations, elements, and the like. In addition, it should be understood that the terms "include" or "have" used in the various example embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various example embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various example embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of various example embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, or there may be an intervening element (e.g., third element) between the element and another element. On the other hand, it will be understood that when an element (e.g., first element) is "directly connected" or "directly coupled" to another element (e.g., second element), there is no intervening element (e.g., third element) between the element and another element.

The expression "configured to (or set to)" used in various example embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be processing circuitry, a dedicated processor, e.g., an embedded processor, for performing a corresponding operation, or a general-purpose processor, e.g., a Central Processing Unit (CPU) or an application processor (AP), capable of performing or configured to perform a corresponding operation by executing one or more software programs stored in a memory device.

The terms as used herein are used to describe certain example embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various example embodiments of the present disclosure.

An electronic device according to various example embodiments of the present disclosure may be a device. For example, the electronic device according to various example embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; a power bank; or a wearable device (e.g., a head-mount-device (HMD), an electronic glasses, an electronic clothing, an electronic bracelet, an electronic necklace, an electronic appcessory, an electronic tattoo, a smart mirror, or a smart watch), or the like.

In other example embodiments, an electronic device may be a home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame, or the like.

In other example embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global navigation satellite system (GNSS); an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like), etc.

In certain example embodiments, an electronic device may include at least one of: a piece of furniture or a building/structure; an electronic board; an electronic signature receiving device; a projector; and various measuring instruments (e.g., a water meter, an electricity meter, a gas meter, or a wave meter), or the like. Further, it will be apparent to those skilled in the art that an electronic device according to various example embodiments of the present disclosure is not limited to the above-mentioned devices.

Herein, the term "user" may indicate a person who uses an electronic device or a device (e.g., an artificial intelligence electronic device) that uses the electronic device.

FIG. 1 is a block diagram illustrating an example network environment including an electronic device.

The electronic device 101 in the network environment 100, according to the various example embodiments, will be described below with reference to FIG. 1. The electronic device 101 may include, for example, a bus 110, a processor (e.g., including processing circuitry) 120, a memory 130, an input/output interface (e.g., including input/output circuitry) 150, a display (e.g., including a display panel and display circuitry) 160, and a communication interface (e.g., including communication circuitry) 170. In an example embodiment, at least one of the elements of the electronic device 101 may be omitted, or other elements may be additionally included in the electronic device 101.

The bus 110 may include, for example, a circuit that interconnects the elements 110 to 170 so that the elements can communicate with one another and transfers signals (e.g., a control message and/or data) between the elements.

The processor 120 may include processing circuitry, including, for example one or more of a central processing unit (CPU), an application processor (AP), and a communication processor (CP). The processor 120 may, for example, be configured to perform an operation or data processing or control and/or communication of at least one other element of the electronic device 101.

The memory 130 may include a volatile memory and/or a non-volatile memory. The memory 130 may store, for example, instructions or data (e.g. pre-stored location information, location information matched with a network) relevant to at least one other element of the electronic device 101. According to an example embodiment, the memory 130 may store software and/or a program 140. For example, the program may include a kernel 141, middleware 143, an application programming interface (API) 145, and an application (or "application program") 147. At least some of the kernel 141, the middleware 143, and the API 145 may, for example, be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143, for example, may function as an intermediary for allowing the API 145 or the application 147 to communicate with the kernel 141 to exchange data.

In addition, the middleware 143 may process one or more task requests received from the application 147 according to priorities thereof. For example, the middleware 143 may assign priorities for using the system resources (e.g., the bus 110, the processor 120, the memory 130, or the like) of the electronic device 101, to at least one of the application 147. For example, the middleware 143 may perform scheduling or loading balancing on the one or more task requests by processing the one or more task requests according to the priorities assigned thereto.

The API 145 may, for example, refer to an interface through which the applications 147 control functions provided from the kernel 141 or the middleware 143, and may include, for example, at least one interface or function (e.g., instruction) for file control, window control, image processing, or text control.

The input/output interface 150, for example, may include input/output circuitry and function as an interface that may be configured to transfer instructions or data input from a user or another external device to the other element(s) of the electronic device 101. Furthermore, the input/output interface 150 may output the instructions or data received from the other element(s) of the electronic device 101 to the user or another external device.

Examples of the display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display, or the like. The display 160, for example, may display various types of content (e.g., text, images, videos, icons, or symbols) to the user. The display 160 may include, for example, a touch screen and receive, for example, a touch, gesture, proximity, or hovering input using an electronic pen or the user's body part.

The communication interface 170, for example, may including communication circuitry configured to set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), or the like, as a cellular communication protocol. In addition, the wireless communication may include, for example, short range communication 164. The short-range communication 164 may, for example, be performed using at least one of, for example, Wi-Fi, Bluetooth, Bluetooth low energy (BLE), Near Field Communication (NFC), and Global Navigation Satellite System (GNSS), or the like. The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system), or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard-232 (RS-232), and a Plain Old Telephone Service (POTS), or the like. The network 162 may include at least one of a communication network such as a computer network (e.g., a LAN or a WAN), the Internet, and a telephone network, or the like.

Each of the first and second external electronic devices 102 and 104 may be of a type similar to or different from that of the electronic device 101. According to an example embodiment, the server 106 may include a group of one or more servers. According to various example embodiments, all or some of the operations performed in the electronic device 101 may be performed in another electronic device or a plurality of electronic devices (e.g., the electronic devices 102 and 104 or the server 106). According to an example embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic device (e.g., the electronic device 102 or 104 or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
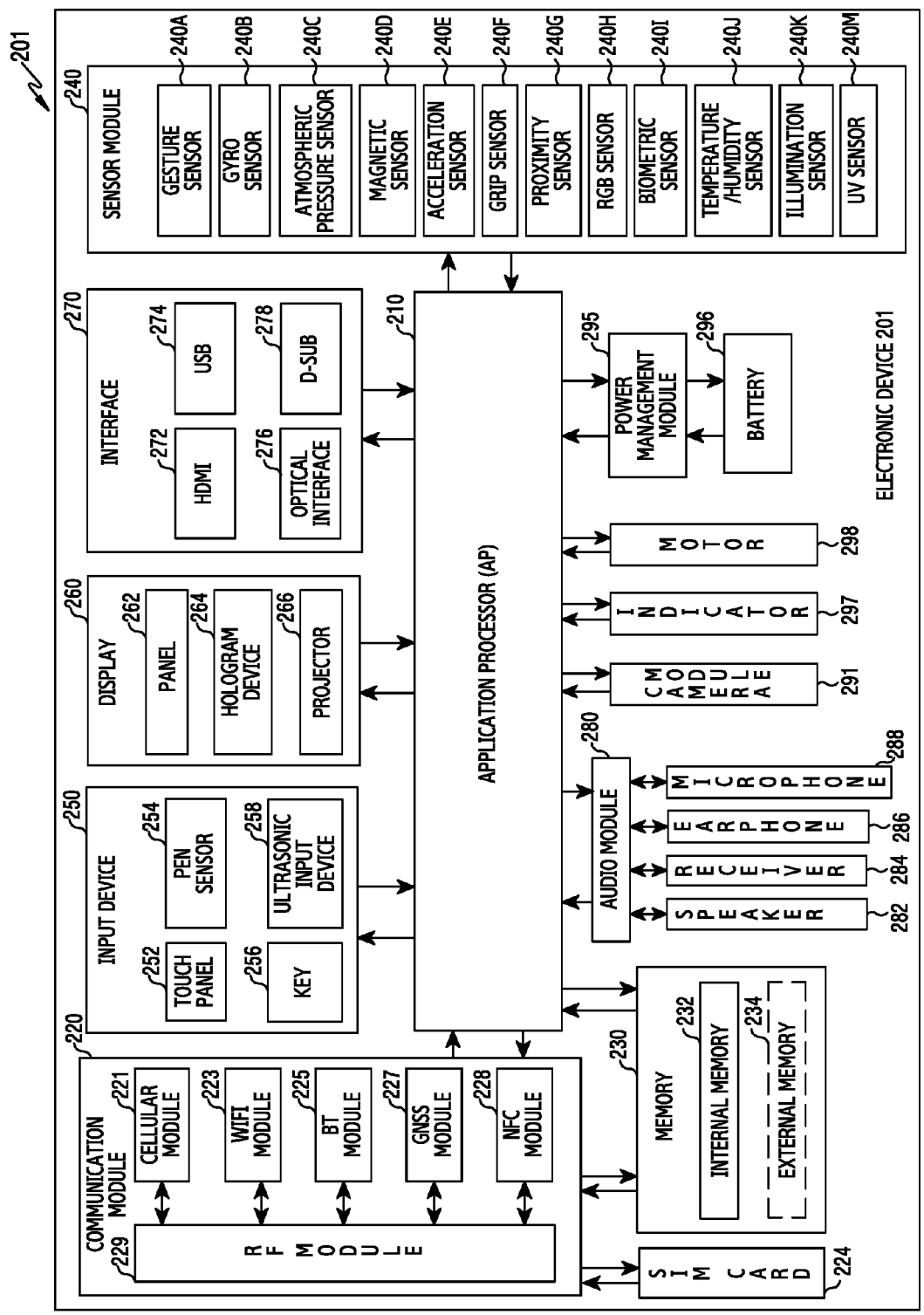
FIG. 2 is a block diagram illustrating an example electronic device.

FIG. 2 is a block diagram illustrating an example electronic device 201. The electronic device 201 may include, for example, all or a part of the electronic device 101 illustrated in FIG. 1. The electronic device 201 may include, for example, at least one application processor (AP, e.g., including processing circuitry) 210, a communication module (e.g., including communication circuitry) 220, a subscriber identification module (SIM) card 224, a memory 230, a sensor module (e.g, including one or more sensors comprised of sensing circuitry) 240, an input device (e.g., including input circuitry) 250, a display (e.g., including display circuitry) 260, an interface 270, an audio module 280, a camera module 291, a power management module 295, a battery 296, an indicator 297, and a motor 298.

The AP 210 may, for example, control a plurality of hardware or software elements connected thereto and perform a variety of data processing and calculations by driving an operating system or application programs. The AP 210 may be implemented as, for example, as various processing circuitry, a system on chip (SoC), or the like. According to an example embodiment, the AP 210 may further include a graphic processing unit (GPU) and/or an image signal processor. The AP 210 may include, for example, at least some of the elements (e.g., a cellular module 221) illustrated in FIG. 2. The AP 210 may load commands or data, received from at least one other element (e.g., a non-volatile memory), in a volatile memory to process the loaded commands or data, and may store various types of data in the non-volatile memory.

The communication module 220 may, for example, have a configuration that is the same as or similar to that of the communication interface 160 of FIG. 1. The communication module 220 may include communication circuitry including, for example, a cellular module 221, a Wi-Fi module 223, a BT module 225, a GNSS module 227, an NFC module 228, and a radio frequency (RF) module 229. The communication module 220 provides a function of transmitting/receiving a signal. Accordingly, the communication module 220 may be referred to as a "reception unit", a "transmission unit", a "transmission and reception unit", a "communication unit", or the like.

The cellular module 221 may provide, for example, a voice call, a video call, a text message service, or an Internet service through a communication network. According to an example embodiment, the cellular module 221 may distinguish and authenticate the electronic device 201 in the communication network by using a subscriber identification module (e.g., the SIM card 224). According to an example embodiment, the cellular module 221 may perform at least some of the functions that the AP 210 may provide. According to an example embodiment, the cellular module 221 may include a communication processor (CP).

The Wi-Fi module 223, the BT module 225, the GNSS module 227, or the NFC module 228 may include, for example, a processor including processing circuitry for processing data transmitted/received through the corresponding module. According to an example embodiment, at least some (e.g., two or more) of the cellular module 221, the Wi-Fi module 223, the BT module 225, the GNSS module 227, and the NFC module 228 may be included in a single integrated chip (IC) or IC package.

The RF module 229 may, for example, transmit/receive a communication signal (e.g., an RF signal). The RF module 229 may include, for example, a transceiver, a power amp module (PAM), a frequency filter, a low noise amplifier (LNA), or an antenna. According to another example embodiment, at least one of the cellular module 221, the Wi-Fi module 223, the BT module 225, the GNSS module 227, and the NFC module 228 may transmit/receive an RF signal through a separate RF module.

The SIM card 224 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

The memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OT-PROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)), or the like.

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected to the electronic device 201 through various interfaces.

The sensor module 240 may include one or more sensors including sensing circuitry that may measure, for example, physical quantity or detect an operational status of the electronic device 201, and may convert the measured or detected information into an electrical signal. The sensor module 240 may include, for example, at least one of a gesture sensor 240A, a gyro sensor 240B, a pressure sensor 240C, a magnetic sensor 240D, an acceleration sensor including an accelerometer 240E, a grip sensor 240F, a proximity sensor 240G, a color sensor 240H (e.g., a Red, Green, Blue (RGB) sensor), a biometric sensor 240I, a temperature/humidity sensor 240J, an illumination sensor 240K, and an Ultra Violet (UV) sensor 240M. Additionally or alternatively, the sensor module 240 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, a force touch sensor, and/or a fingerprint sensor, or the like. The sensor module 240 may further include a control circuit for controlling at least one or more sensors included therein. In example embodiment, the electronic device 201 may further include a processor configured to control the sensor module 240 either separately or as a part of the processor 210, and may control the sensor module 240 while the processor 210 is in a sleep state.

The input device 250 may include input circuitry including, for example, a touch panel 252, a (digital) pen sensor 254, a key 256, or an ultrasonic input device 258. The touch panel 252 may use at least one of, for example, a capacitive type, a resistive type, an infrared type, and an ultrasonic type, or the like. In addition, the touch panel 252 may further include a control circuit. The touch panel 252 may further include a tactile layer to provide a tactile reaction to a user.

The (digital) pen sensor 254 may be, for example, a part of the touch panel, or may include a separate recognition sheet. The key 256 may include, for example, a physical button, an optical key, or a keypad, or the like. The ultrasonic input device 258 may identify data by detecting acoustic waves with a microphone (e.g., a microphone 288) of the electronic device 201 through an input unit for generating an ultrasonic signal.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201. According to an example embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included in, for example, the communication interface 160 illustrated in FIG. 1. Additionally, or alternatively, the interface 270 may include, for example, a mobile high-definition link (MHL) interface, a secure digital (SD) card/multimedia card (MMC) interface, or an infrared data association (IrDA) standard interface, or the like.

The audio module 280 may include audio processing circuitry that may be configured to, for example, convert a sound into an electrical signal, and vice versa. At least some elements of the audio module 280 may be included in, for example, the input/output interface 140 illustrated in FIG. 1. The audio module 280 may, for example, process sound information that is input or output through the speaker 282, the receiver 284, the earphones 286, the microphone 288, or the like.

The camera module 291 may be, for example, a device that can take a still image or a moving image, and according to an example embodiment, the camera module 291 may include one or more image sensors (e.g., a front sensor or a rear sensor), a lens, an image signal processor (ISP), or a flash (e.g., an LED or a xenon lamp).

The power management module 295 may, for example, manage power of the electronic device 201. According to an example embodiment, the power management module 295 may include a Power Management Integrated Circuit (PMIC), a charger IC, or a battery or fuel gauge. The PMIC may use a wired and/or wireless charging method. Examples of the wireless charging method may include, for example, a magnetic resonance scheme, a magnetic induction scheme, an electromagnetic wave scheme, and the like. Further, the power management module 295 may further include additional circuits (e.g., a coil loop, a resonance circuit, a rectifier, etc.) for wireless charging. The battery gauge may measure, for example, a residual quantity of the battery 296, and a voltage, a current, or a temperature during the charging. The battery 296 may include, for example, a rechargeable battery and/or a solar battery.

The indicator 297 may indicate a specific state of the electronic device 201 or a part thereof (e.g., the AP 210), for example, a booting state, a message state, a charging state, or the like. The motor 298 may convert an electrical signal into a mechanical vibration, and may generate a vibration or haptic effect. Although not illustrated, the electronic device 201 may include a processing unit (e.g., a GPU) for mobile TV support. The processing device for mobile TV support may, for example, process media data according to a standard of digital multimedia broadcasting (DMB), digital video broadcasting (DVB), media flow, or the like.

Each of the components of the electronic device according to the present disclosure may be implemented by one or more components and the name of the corresponding component may vary depending on a type of the electronic device. In various example embodiments, the electronic device may include at least one of the above-described elements. Some of the above-described elements may be omitted from the electronic device, or the electronic device may further include additional elements. Further, some of the elements of the electronic device according to various example embodiments of the present disclosure may be coupled to form a single entity while performing the same functions as those of the corresponding elements before the coupling.

Figure 3:
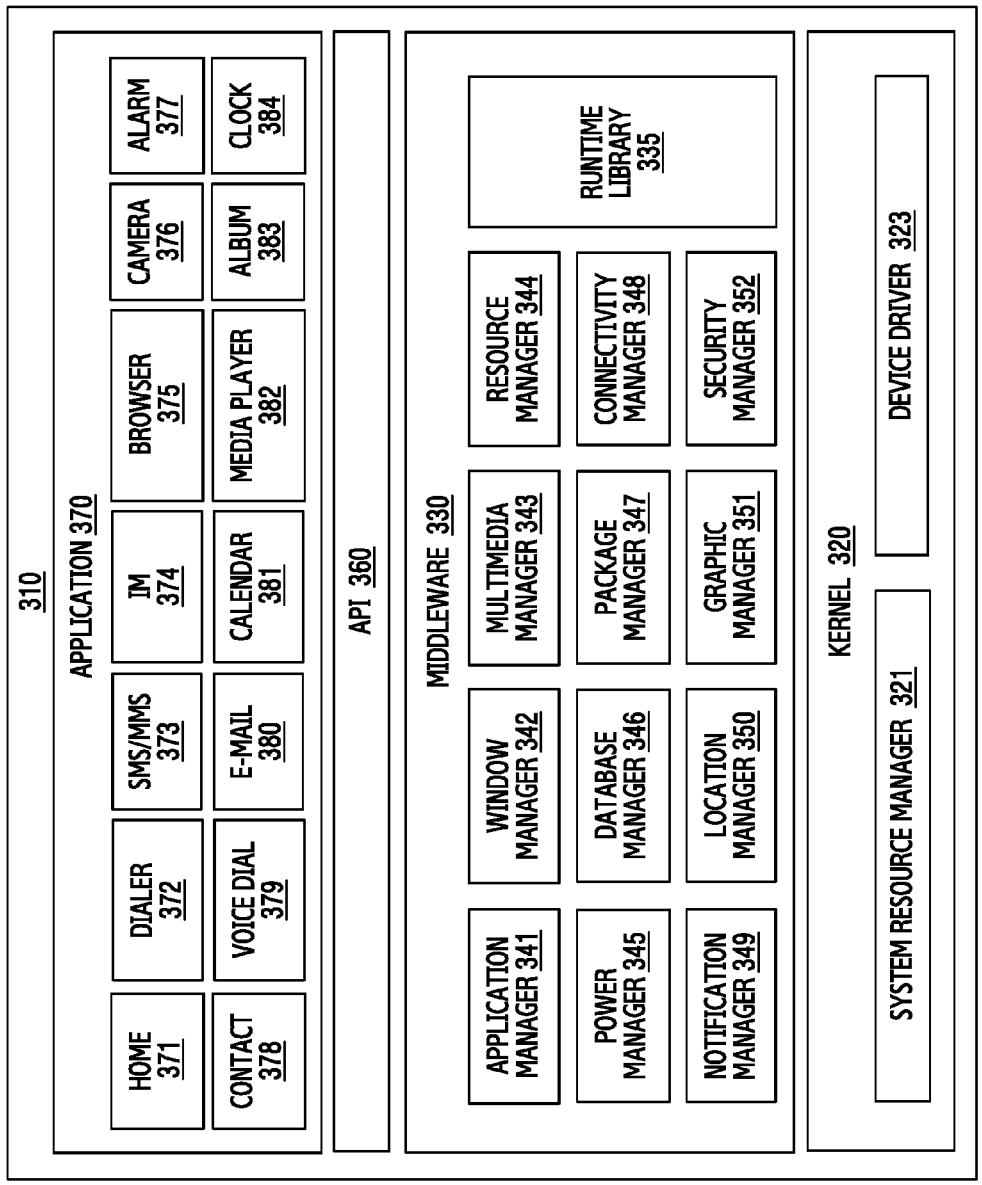
FIG. 3 is a block diagram illustrating an example program module.

FIG. 3 is a block diagram illustrating an example program module 310. According to an example embodiment, the program module 310 (e.g., the program 140) may include an operating system (OS) that controls resources relating to an electronic device (e.g., the electronic device 101) and/or various applications (e.g., the application 147) executed in the operating system. The operating system may be, for example, Android, iOS™, Windows™, Symbian™, Tizen™, Bada™, or the like.

The programming module 310 may include a kernel 320, middleware 330, an application programming interface (API) 360, and/or applications 370. At least some of the program module 310 may be preloaded in the electronic device, or may be downloaded from an external electronic device (e.g., the electronic device (102, 104), the server 106).

The kernel 320 (e.g., the kernel 141 of FIG. 1) may include, for example, a system resource manager 321 or a device driver 323. The system resource manager 321 may control, allocate, or collect system resources. According to an example embodiment, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a Wi-Fi driver, an audio driver, or an inter-process communication (IPC) driver.

The middleware 330 may provide a function required by the applications 370 in common, or may provide various functions to the applications 370 through the API 360 to enable the applications 370 to efficiently use limited system resources in the electronic device. According to an example embodiment, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler in order to add a new function through a programming language during the execution of the applications 370. The run time library 335 may perform input/output management, memory management, or a function for an arithmetic function.

The application manager 341 may manage, for example, a life cycle of at least one of the applications 370. The window manager 342 may manage GUI resources used by a screen. The multimedia manager 343 may identify a format required for reproducing various media files, and may encode or decode a media file using a codec suitable for the corresponding format. The resource manager 344 may manage resources of at least one of the applications 370, such as a source code, a memory, a storage space, and the like.

The power manager 345 may operate together with, for example, a basic input/output system (BIOS) to manage a battery or power and provide power information required for an operation of the electronic device. The database manager 346 may generate, search, or change a database to be used by at least one of the applications 370. The package manager 347 may manage installation or update of an application distributed in the format of a package file.

The connectivity manager 348 may manage, for example, a wireless connection, such as Wi-Fi or Bluetooth. The notification manager 349 may display or notify of an event, such as a received message, an appointment, and a proximity notification, in such a manner as not to disturb a user. The location manager 350 may manage location information of the electronic device. The graphic manager 351 may manage a graphic effect to be provided to a user, or a user interface related thereto. The security manager 352 may provide all security functions required for system security or user authentication. According to an example embodiment, in cases where the electronic device (e.g., the electronic device 101) has a telephone call function, the middleware 330 may further include a telephony manager for managing a voice or video call function of the electronic device.

The middleware 330 may include a middleware module that forms combinations of various functions of the aforementioned elements. The middleware 330 may provide specialized modules according to the types of operating systems in order to provide differentiated functions. In addition, the middleware 330 may dynamically delete some of the existing elements, or may add new elements.

The API 360 (e.g., the API 145) may be, for example, a set of API programming functions, and may be provided with different configurations according to operating systems. For example, in the case of Android or iOS, one API set may be provided for each platform, and in the case of Tizen, two or more API sets may be provided for each platform.

The applications 370 (e.g., the application 147) may include, for example, one or more applications that can provide functions, such as home 371, dialer 372, SMS/MMS 373, instant message (IM) 374, browser 375, camera 376, alarm 377, contact 378, voice dialer 379, e-mail 380, calendar 381, media player 382, album 383, clock 384, health care (e.g., to measure exercise quantity or blood sugar), or environment information (e.g., atmospheric pressure, humidity, or temperature information).

According to an example embodiment, the applications 370 may include an application (hereinafter, referred to as an "information exchange application" for convenience of the description) that supports information exchange between the electronic device (e.g., the electronic device 101) and external electronic devices (e.g., the electronic devices 102 and 104). The information exchange application may include, for example, a notification relay application for transmitting specific information to the external electronic device, or a device management application for managing the external electronic device.

For example, the notification relay application may include a function of transferring, to an external electronic device (e.g., the electronic device 102 or 104), notification information generated from other applications of the electronic device (e.g., an SMS/MMS application, an e-mail application, a health management application, or an environmental information application). Furthermore, the notification relay application may, for example, receive notification information from an external electronic device and provide the received notification information to a user. The device management application may, for example, manage (e.g., install, delete, or update) at least one function of an external electronic device (e.g., the electronic device 104) communicating with the electronic device (for example, a function of turning on/off the external electronic device itself (or some elements thereof), or a function of adjusting luminance (or a resolution) of the display), applications operating in the external electronic device, or services provided by the external electronic device (e.g., a telephone call service or a message service).

According to an example embodiment, the applications 370 may include an application (e.g., a health care application) specified according to attributes (e.g., attributes of the electronic device such as the type of electronic device which corresponds to a mobile medical device) of the external electronic device (e.g., the electronic device 102 or 104). According to an example embodiment, the applications 370 may include an application received from an external electronic device (e.g., the server 106 or the electronic device 102 or 104). According to an example embodiment, the applications 370 may include a preloaded application or a third party application that can be downloaded from a server. The names of the elements of the program module 310, according to the embodiment illustrated in the drawing, may vary according to the type of operating system.

According to various example embodiments, at least a part of the programming module 310 may be implemented in software, firmware, hardware (e.g., circuitry), or a combination of two or more thereof. At least some of the programming module 310 may be implemented (for example, executed) by, for example, the processor (for example, the AP 210). At least some of the programming module 310 may include, for example, a module, program, routine, sets of instructions, process, or the like for performing one or more functions.

Figure 4:
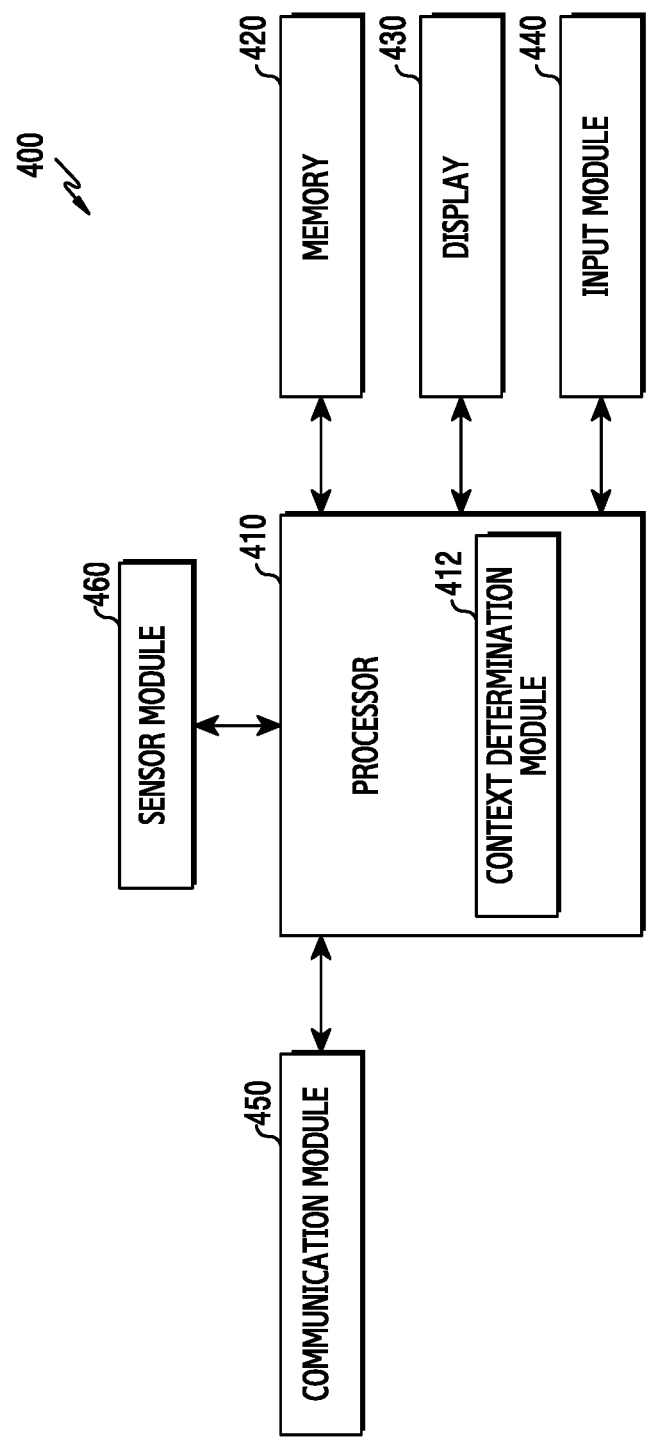
FIG. 4 is a block diagram illustrating an example electronic device for recognizing context information.

FIG. 4 is a block diagram illustrating an example electronic device for recognizing context information. An electronic device 400 may include, for example, all or some parts of the electronic device 101 of FIG. 1 or the electronic device 201 of FIG. 2.

Referring to FIG. 4, the electronic device 400 may include a processor (e.g., including processing circuitry) 410, a memory 420, a display (e.g., including a display panel and display circuitry) 430, an input module (e.g., including input circuitry) 440, a communication module (e.g., including communication circuitry) 450, and a sensor module (e.g., including at least one sensor including sensor circuitry) 460.

The electronic device 400 may include at least one processor 410 (e.g., the processor 120 of FIG. 1). The processor 410 may include processing circuitry, a Central Processing Unit (CPU), an Application Processor (AP), or a Communication Processor (CP).

The processor 410 may be configured to determine flight context information through a context determination module (e.g., including context determination circuitry, firmware and/or software) 412. For example, the context determination module 412 may be configured to determine a taking-off, landing, or in-flight state of a plane based, for example, on an in-flight air pressure change pattern measured through the sensor module 460.

According to an example embodiment, when an air pressure decrease greater than or equal to a reference is detected during a reference time after a temporary air pressure increase occurs from a state 1 in which an air pressure change rate is 0 or negligible since a plane boarded by a user who has the electronic device 400 is preparing for taking off, the context determination module 412 may determine that the plane has taken off. If the electronic device 400 is not set to a flight mode, the processor 410 may be configured to change an operation mode of the electronic device 400 to the flight mode. For example, the flight mode may indicate an operation mode of deactivating a function such as a wireless communication function or the like capable of having an effect on a flight of the plane. For example, the reference may indicate a pre-defined air pressure to distinguish an air pressure decrease depending on an altitude increase of the plane.

According to an example embodiment, upon detecting the temporary air pressure increase and an acceleration change greater than or equal to the reference in the state 1 in which the air pressure change rate is 0 or negligible, the context determination module 412 may determine that the plane boarded by the user having the electronic device 400 has taken off. If the electronic device 400 is not set to the flight mode, the processor 410 may be configured to change the operation mode of the electronic device 400 to the flight mode.

According to an example embodiment, when the air pressure decrease greater than or equal to the reference is detected during the reference time after detecting the temporary air pressure increase and the acceleration change greater than or equal to the reference in the state 1 in which the air pressure change rate is 0 or negligible, the context determination module 412 may determine that the plane boarded by the user having the electronic device 400 has taken off. If the electronic device 400 is not set to the flight mode, the processor 410 may be configured to change the operation mode of the electronic device 400 to the flight mode.

According to an example embodiment, when the air pressure decrease greater than or equal to the reference is detected during the reference time after detecting the acceleration change greater than or equal to the reference in the state 1 in which the air pressure change rate is 0 or negligible, the context determination module 412 may determine that the plane boarded by the user having the electronic device 400 has taken off. If the electronic device 400 is not set to the flight mode, the processor 410 may be configured to change the operation mode of the electronic device 400 to the flight mode.

According to an example embodiment, after recognizing the taking-off of the plane, if the air pressure decrease occurs after in-flight air pressure is continuously increased to be greater than or equal to a reference, the context determination module 412 may determine that the plane boarded by the user having the electronic device 400 has landed. If the electronic device 400 is set to the flight mode, the processor 410 may be configured to release the flight mode of the electronic device 400. For example, the reference may indicate a pre-defined air pressure to distinguish an air pressure increase depending on an altitude decrease of the plane.

According to an example embodiment, upon detecting an airport through, for example, a geofence function, the processor 410 may be configured to perform at least one of an airport geofence related function operation, an application operation, and a mode change. Further, the processor 410 may be configured to activate the air pressure sensor of the sensor module 460. The context determination module 412 may determine flight context information of the electronic device 400 based on an air pressure change pattern detected through the air pressure sensor activated by the control of the processor 410.

According to an example embodiment, upon identifying a taking-off state of the plane through the context determination module 412, the processor 410 may be configured to provide in-flight service information for user convenience. For example, the processor 410 may be configured to control the display 430 to display at least one of flight time information, in-flight environment information (e.g., temperature, humidity, and air pressure), duty free product purchase information, meal menu information, and in-flight safety guide information, or the like. The processor 410 may be configured to control the display 430 to display time difference information regarding an origin and a destination. The processor 410 may be configured to control the display 430 to display information for guiding how to fill out an arrival card. The processor 410 may be configured to control the display 430 to display health guide information for preventing an economy class syndrome.

According to an example embodiment, upon identifying a landing state of the plane through the context determination module 412, the processor 410 may be configured to provide location-based service information corresponding to plane landing. For example, the processor 410 may be configured to control the display 430 to display at least one of immigration procedure guide information, weather information of the destination, and transportation information from an airport to an accommodation. The processor 410 may also be configured to perform a translation function.

According to an example embodiment, upon identifying the landing state of the plane through the context determination module 412, the processor may be configured to provide location-based service information corresponding to the destination. For example, the processor 410 may be configured to provide nearby tourist attraction information, famous restaurant information, transportation search information, a travel account book, a travel guide, a travel history, and location alert information.

The memory 420 may store an instruction or data related to constitutional elements of the electronic device.

The display 430 may display various contents (e.g., a text, an image, a video, an icon, a symbol, or the like) to the user.

The input module 440 may deliver to other element(s) of the electronic device an instruction or data which is input from the user or other external devices to control an operation of the electronic device. For example, the input module 440 may include a key pad, a dome switch, a physical button, a touch pad (static pressure/electrostatic), jog & shuttle, or the like.

The communication module 450 may transmit/receive a signal between the electronic device 400 and an external device (e.g., an external electronic device or a server). For example, the communication module 450 may be coupled to a network through wireless communication or wired communication to communicate with the external device.

The sensor module 460 may generate sensing data by converting measurement information regarding physical quantity or detection information regarding an operational state of the electronic device into an electrical signal. For example, the sensor module 460 may include an accelerometer, a magnetic sensor, an air pressure sensor, or the like. For example, the sensor module 460 may further include a control circuit configured to control at least one sensor included in the sensor module 460.

According to various example embodiments, a portable electronic apparatus may include a communication module, an air pressure sensor configured to measure air pressure, a processor electrically coupled to the communication module and the air pressure sensor, and a memory electrically coupled to the processor. The memory may store instructions which, when executed, configure the processor to operate the electronic device to determine whether the electronic device is located in a first geofence using the communication module, to start monitoring of the air pressure using the air pressure sensor based in part on at least the determining that the electronic device is located in the first geofence, to deactivate at least one part of the communication module when the monitored air pressure satisfies a first range and/or a first change rate, and to re-activate the deactivated at least one part of the communication module when the monitored air pressure satisfies a second range and/or a second change rate after the at least one part of the communication module is deactivated.

According to various example embodiments, the instructions may configure the processor to operate the electronic device, after the at least one part of the communication module is re-activated, to determine whether the electronic device is located in a second geofence using the communication module and to stop monitoring of air pressure measured using the air pressure sensor based in part on at least the determining that the electronic device is located in the second geofence. According to various example embodiments, the instructions may configure the processor to operate the electronic device to determine whether the electronic device is located in the second geofence using the communication module, and to provide a service related to the second geofence based in part on at least the determining that the electronic device is located in the second geofence.

According to various example embodiments, the service related to the second geofence may include at least one of a function operation related to the second geofence, an application operation, and a mode change.

According to various example embodiments, the instructions may configure the processor to operate the electronic device to detect an air pressure increase in a state in which the air pressure is constantly maintained, and if an air pressure decrease is continuously detected during a reference time, to deactivate at least one part of the communication module.

According to various example embodiments, the apparatus may further include a sensor module for detecting a motion of the electronic device. The instructions may configure the processor to operate the electronic device to deactivate at least one part of the communication module if an air pressure increase and an acceleration change greater than or equal to a reference level are detected in a state in which the air pressure is constantly maintained.

According to various example embodiments, the apparatus may further include a sensor module for detecting a motion of the electronic device. The instructions configure the processor to operate the electronic device to deactivate the at least one part of the communication module if an acceleration change greater than or equal to a first reference is continuously detected in a state in which air pressure is constantly maintained and if an air pressure decrease greater than or equal to a second reference is continuously detected.

According to various example embodiments, the apparatus may further include a sensor module for detecting a motion of the electronic device. The instructions may configure the processor to operate the electronic device to deactivate at least one part of the communication module if an air pressure increase and an acceleration change greater than or equal to a reference level are detected in a state in which the air pressure is constantly maintained and if an air pressure decrease greater than or equal to a second reference size is continuously detected during a reference time.

According to various example embodiments, the instructions may configure the processor to operate the electronic device re-activate the deactivated at least one part of the communication module if an air pressure increase greater than or equal to a reference level is continuously detected during a reference time and an air pressure decrease is detected after the at least one part of the communication module is deactivated.

According to various example embodiments, the apparatus may further include a sensor module for detecting a motion of the electronic device. The instructions may configure the processor to operate the electronic device reactivate the deactivated at least one part of the communication module if an air pressure increase greater than or equal to a first reference level is continuously detected and an acceleration change greater than or equal to a second reference level is detected through a sensor module after the at least one part of the communication module is deactivated.

According to various example embodiments, the instructions may configure the processor to operate the electronic device to provide an in-flight service information when the monitored air pressure satisfies a first range and/or a first change rate. The in-flight service information may include at least one of flight information, in-flight environment information, in-flight exercise information, information for guiding how to fill out an arrival card, in-flight safety guide information, and time difference information.

According to various example embodiments, the instructions may configure the processor to operate the electronic device stop radio signal scanning using at least one part of a communication module of the electronic device when the monitored air pressure satisfies a first range and/or a first change rate.

According to various example embodiments, the at least one part of the communication module may include a WiFi module and/or a Bluetooth module. The radio signal scanning may include scanning for detecting the first geofence.

According to various example embodiments, an electronic device may include a communication module, an air pressure sensor configured to measure air pressure, a processor electrically coupled to the communication module and the air pressure sensor, and a memory electrically coupled to the processor. The memory may store instructions which, when executed, may configure the processor to operate the electronic device to start monitoring of air pressure measured using the air pressure sensor, to determine that a plane in which the electronic device is located has taken off when the monitored air pressure satisfies a first change rate, and to determine that the plane has landed when the monitored air pressure satisfies a second change rate in a state in which it is determined that the plane has taken off.

According to various example embodiments, the first change rate may include an air pressure change pattern in which an air pressure decrease greater than or equal to a reference level occurs continuously during a reference time after an air pressure increase occurs in a state in which the air pressure is constantly maintained.

According to various example embodiments, the second change rate may include an air pressure change pattern in which an air pressure decrease occurs after an air pressure increase greater than or equal to a reference occurs continuously during a reference time in a state in which it is determined that the plane has taken off.

Figure 5A:
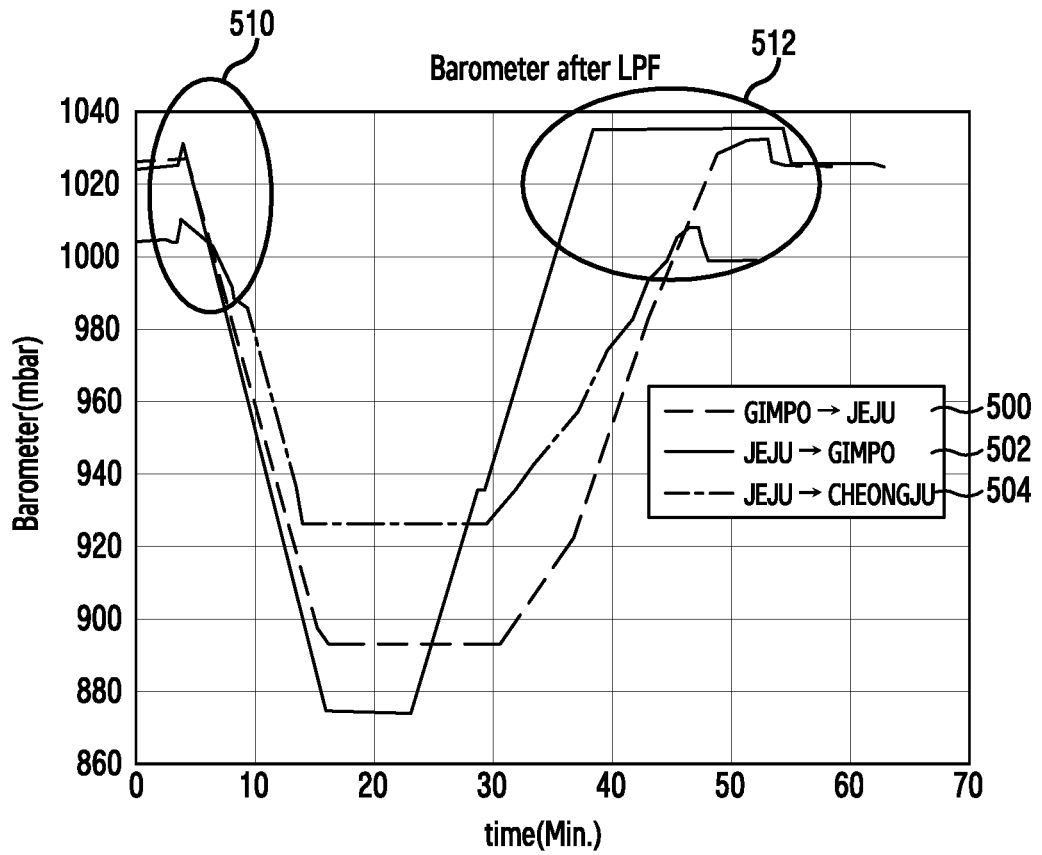
FIG. 5A and FIG. 5B are graphical diagrams illustrating an example in-flight air pressure change measured by an air pressure sensor of an electronic device.
Figure 5B:
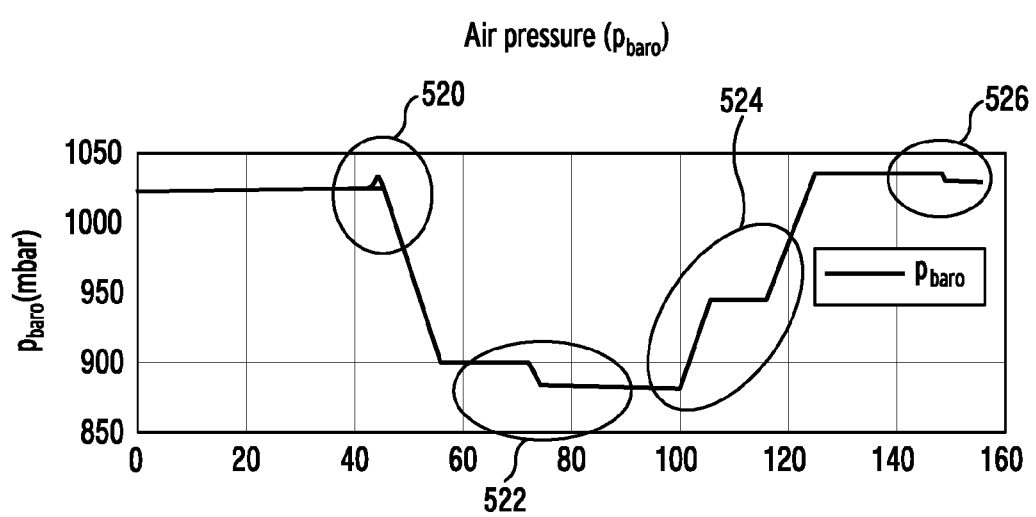

FIG. 5A and FIG. 5B are diagrams illustrating graphs of an example in-flight air pressure change measured by an air pressure sensor of an electronic device Referring to FIG. 5A, a plane flies along an air route having a square tube shape. Accordingly, the plane may have a different air pressure change depending on the air route. For example, a first air route 500 along which the plane flies from Gimpo to Jeju, a second air route 502 along which the plane flies from Jeju to Gimpo, and a third air route 504 along which the plane flies from Jeju to Cheongju may have different absolute in-flight air pressure values and in-flight air pressure change rates due to an altitude difference of each air route.

An in-flight air pressure change pattern depending on a pressurization device of the plane may be as illustrated in FIG. 5A. For example, the in-flight air pressure of the plane may change by the pressurization device. The pressurization device is a device for maintaining in-flight air pressure to a level suitable for a passenger activity by utilizing compressed air generated in a turbine of the plane, and may be driven from a time at which the turbine operates for plane taking-off. Accordingly, when the turbine operates for the plane taking-off, the in-flight air pressure may be temporarily increased by the pressurization device, and the in-flight air pressure may be continuously decreased since an altitude of the plane is increased after the taking-off (510). After the plane taking-off, the in-flight air pressure may be continuously increased since the altitude is decreased for landing, and the in-flight air pressure increased artificially by the pressurization device after the landing may be restored to original air pressure by opening a door of the plane, which may lead to an air pressure decrease (512).

Referring to FIG. 5B, in an example of an air route along which a plane flies, for example, from Incheon to China, an in-flight air pressure change pattern caused by a pressurization device may be similar to that illustrated in FIG. 5A. For example, when a turbine operates for plane taking-off, the in-flight air pressure may be temporarily increased by the pressurization device, and the in-flight air pressure may be continuously decreased since an altitude of the plane is increased after the taking-off (520). When the plane cruises while maintaining a specific altitude, the in-flight air pressure may be constantly maintained (522). The in-flight air pressure may be continuously increased since the altitude is decreased for landing (524), and the in-flight air pressure increased artificially by the pressurization device after the landing may be restored to original air pressure by opening a door of the plane, which may lead to an air pressure decrease (526).

Figure 6A:
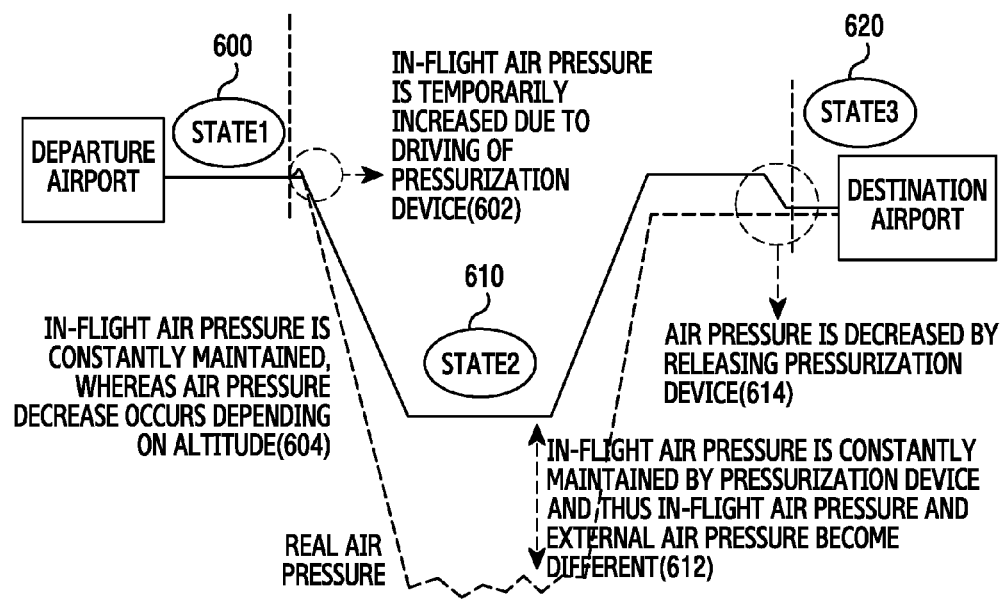
FIG. 6A and FIG. 6B are state diagrams illustrating example states corresponding to an air pressure change.
Figure 6B:
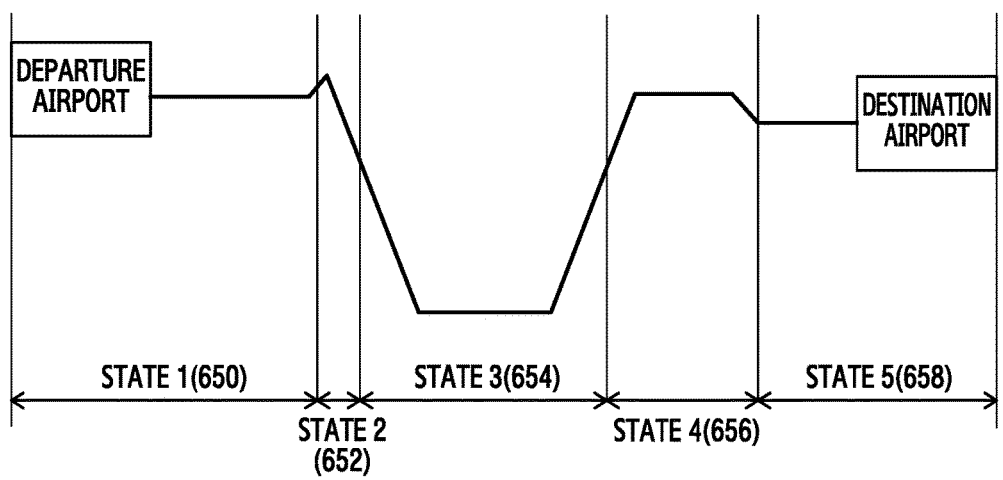

FIG. 6A and FIG. 6B are state diagrams illustrating an example state corresponding to an air pressure change.

An electronic device may determine flight context (e.g., taking-off, cruising, and landing) based on a change pattern of in-flight air pressure measured by an air pressure sensor as illustrated in FIG. 5A or FIG. 5B.

Referring to FIG. 6A, the electronic device (e.g., the electronic device 101, 201, or 400) may set a state in which an air pressure change rate is 0 or negligible in a plane which is preparing for taking off as a state 1 (600).

According to an example embodiment, after a temporary air pressure increase occurs due to driving of a pressurization device (602), upon detecting an air pressure decrease greater than or equal to a first reference level (604), the electronic device may determine a state 2 (610) in which the plane boarded by a user of the electronic device has taken off. For example, if air pressure satisfies a first change rate (602, 604), the electronic device may determine the state 2 (610) in which the plane boarded by the user of the electronic device has taken off. For example, the first reference level may indicate a level of pre-defined air pressure to distinguish an air pressure decrease depending on an altitude increase of the plane.

According to an example embodiment, after recognizing taking off of the plane, if in-flight air pressure is constantly maintained (612), the electronic device may determine that the plane cruises while maintaining a specific altitude.

According to an example embodiment, if the in-flight air pressure is continuously increased to be greater than or equal to a second reference size in the state 2 (610) and an air pressure decrease occurs due to a release of the pressurization device (614), the electronic device may determine a state 3 (620) in which the plane boarded by the user of the electronic device has landed. For example, if the air pressure satisfies a second change rate (614), the electronic device may determine the state 3 (620) in which the plane boarded by the user of the electronic device has landed. For example, the second reference level indicates a level of air pressure pre-defined to distinguish an air pressure increase depending on an altitude decrease of the plane, and may be set to be the same as or different from the first reference size.

Referring to FIG. 6B, upon detecting a geofence (e.g., a first geofence) of an airport, the electronic device (e.g., the electronic device 101, 201, or 400) may activate an air pressure sensor to monitor an air pressure change (e.g., a state 1 (650)). In addition, the electronic device may provide a service related to the first geofence in the state 1 (650). The electronic device may perform at least one of an airport geofence related function operation, an application operation, and a mode change. For example, the airport geofence related service may include a guidance of a ticketing location, a guidance of airport facilities (e.g., a currency exchange office, a communication service counter for roaming, a duty free shop, etc.), a guidance of a boarding gate, or the like.

According to an example embodiment, when a user who has the electronic device is on board and an air pressure change is detected, the electronic device may determine that this is a plane taking-off situation (e.g., a state 2 (652)). For example, if an air pressure decrease is continuously detected after detecting a temporary air pressure increase in the state 1 (650), the electronic device may determine a state in which a plane boarded by the user having the electronic device has taken off. Upon detecting the state 2 (652), the electronic device may deactivate a cellular module. In addition, the electronic device may stop scanning using a WLAN (e.g., WiFi, LiFi) and/or Bluetooth module for a geofence service.

According to an example embodiment, if the state 2 (652) is not recognized for more than a specific time in the state 1 (650), the electronic device may stop monitoring of the air pressure change. Alternatively, the electronic device may deactivate the air pressure sensor.

According to an example embodiment, the electronic device may deactivate a cellular module and stop the scanning using a WLAN (e.g., WiFi or LiFi) and/or Bluetooth module, and thereafter may determine a state 3 (654). The electronic device may provide an in-flight service information in the state 3 (654).

According to an example embodiment, if the in-flight air pressure is constantly maintained during a specific reference time while the in-flight air pressure is decreased after the state 2 (652), the electronic device may determine the state 3 (654). Upon determining the state 3 (654), the electronic device may provide an in-flight service information. For example, the electronic device may provide the in-flight service information suitable for the user on the basis of information such as an airline, type, seat class (i.e., business/economy), seat position (i.e., window/aisle), air route, or the like of the plane boarded by the user having the electronic device. For example, the in-flight service information may include providing of flight information, recommending of exercises, providing of an amount of exercises, providing of in-flight environment information, providing of in-flight entertainment information, or the like.

According to an example embodiment, upon detecting an air pressure change greater than or equal to a designated specific time in the state 3 (654), the electronic device may determine that a landing situation (e.g., a state 4 (656)) has occurred or is occurring. For example, upon detecting an air pressure decrease caused by stopping of an operation of a pressurization device after the air pressure is continuously increased in the state 3 (654), the electronic device may determine a state in which the plane boarded by the user having the electronic device has landed. Upon determining the state 4 (656), the electronic device may activate a communication module deactivated in the state 2 (652). Further, the electronic device may start scanning of a WLAN (e.g., WiFi or LiFi) and/or Bluetooth module for geofence detection.

According to an example embodiment, upon detecting a geofence (i.e., a second geofence) of a destination airport in the state 4 (656), the electronic device may determine entering of a state 5 (658). Upon determining the state 5 (658), the electronic device may stop monitoring of the air pressure, and may provide a service information related to the second geofence. In this example, the electronic device may provide a service information different from a normal service information based on entering of an airport geofence on the basis of context information indicating the plane landing. For example, the service related to the geofence of the destination airport may include an immigration procedure guide, providing of local weather information, a guide to a place for immigration formalities, a guide to a place for baggage claims, providing of nearby tourist attraction information, a guide to transportation, a travel service, or the like.

Figure 7:
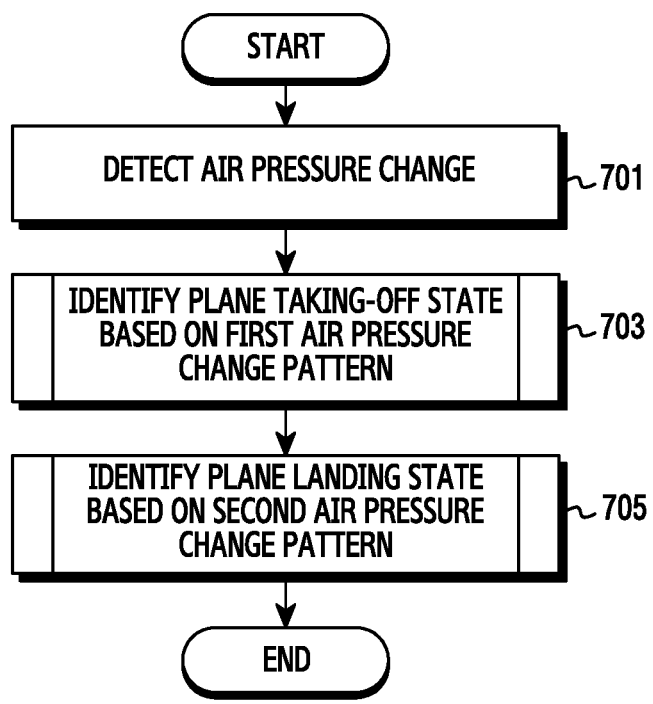
FIG. 7 is a flowchart illustrating an example of determining a state on the basis of an air pressure change pattern in an electronic device.

FIG. 7 is a flowchart illustrating an example of determining a state on the basis of an air pressure change pattern in an electronic device.

Referring to FIG. 7, in operation 701, an electronic device (e.g., the electronic device 101 or 201 or 400) may monitor air pressure using an air pressure sensor. For example, the electronic device may detect the air pressure change pattern through air pressure data measured by using the air pressure sensor.

In operation 703, if the monitored air pressure satisfies a first change pattern, the electronic device may identify a taking-off state of a plane. For example, if an in-flight air pressure generated by a pressurization device of the plane satisfies a first range (e.g., 960 to 980 mbar of FIG. 5A) and/or a first change rate, the electronic device may determine that the plane boarded by a user having the electronic device has taken off. For example, the first change rate may include a change pattern of a continuous air pressure decrease after a temporary air pressure increase occurs, or a change pattern of a continuous air pressure decrease. The first range may be set on the basis of a type and/or air route of the plane.

In operation 705, if the monitored air pressure satisfies a second change pattern, the electronic device may identify a landing state of the plane. For example, if an in-flight air pressure generated by the pressurization device of the plane satisfies a second range and/or a second change rate (e.g., an air pressure decrease after a continuous air pressure increase occurs), the electronic device may determine that the plane boarded by the user having the electronic device has landed. For example, the second change range may be set to be the same as or different from the first range (e.g., 960 to 980 mbar of FIG. 5A) on the basis of a type and/or air route of the plane.

Figure 8:
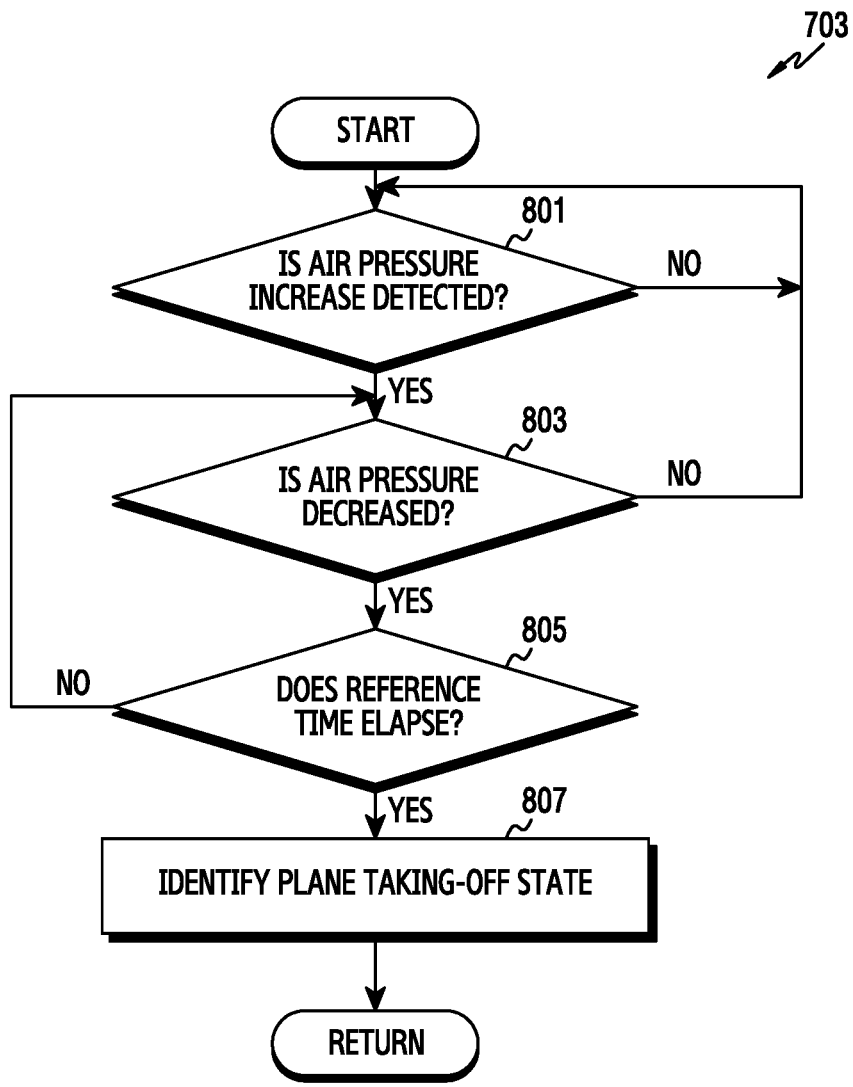
FIG. 8 is a flowchart illustrating an example of identifying a taking-off state of a plane on the basis of an air pressure change pattern in an electronic device.

FIG. 8 is a flowchart illustrating an example of identifying a taking-off state of a plane on the basis of an air pressure change pattern in an electronic device. The following description refers to an operation for identifying the taking-off state of the plane, such as, for example in operation 703 of FIG. 7 above.

Referring to FIG. 8, in operation 801, an electronic device (e.g., the electronic device 101 or 201 or 400) may identify whether an air pressure increase is detected. For example, the electronic device may identify whether a temporary air pressure increase is detected in the state 1 (600 or 650) of FIG. 6A or FIG. 6B. For example, the state 1 may indicate a taking-off hold state or a state in which a user having the electronic device does not board the plane.

In operation 803, upon detecting an air pressure increase, the electronic device may identify whether an air pressure decrease greater than or equal to a reference level is detected. For example, the electronic device may identify whether the air pressure decrease caused by an altitude increase of the plane is detected.

If the air pressure increase is not detected in operation 801 or the air pressure decrease is not detected in operation 803, the electronic device may re-identify whether the air pressure increase is detected in operation 801.

In operation 805, upon detecting the air pressure decrease greater than or equal to the reference level, the electronic device may identify whether a reference time elapses from a time at which the air pressure decrease occurs. For example, the reference time may be determined on the basis of a type or air route of the plane.

If the reference time does not elapse from the time at which the air pressure decrease occurs, returning to operation 803, the electronic device may re-identify whether the air pressure decrease greater than or equal to the reference size is continuously detected.

In operation 807, if the reference time elapses after the time at which the air pressure decrease occurs, the electronic device may determine that the plane boarded by the user having the electronic device has taken off. For example, as illustrated in FIG. 6A, after a temporary air pressure increase occurs due to the driving of a pressurization device of the plane (operation 801), if the air pressure decrease is continued during a reference time due to an altitude increase of the plane (operations 803 and 805) (602, 604) (a first change rate), the electronic device may determine that the plane boarded by the user having the electronic device has taken off.

Figure 9:
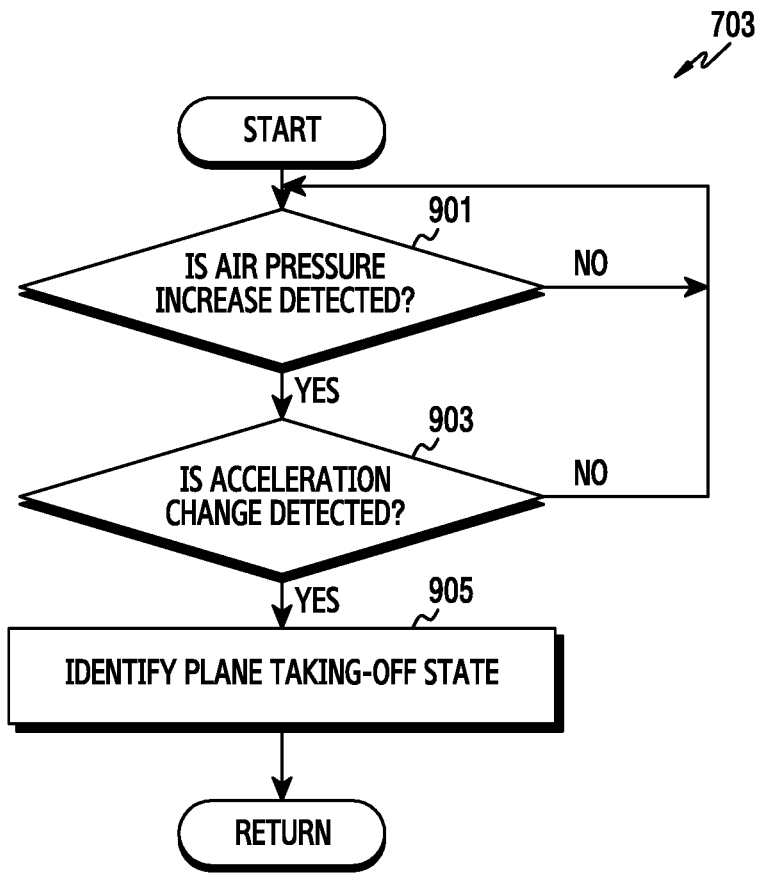
FIG. 9 is a flowchart illustrating an example of identifying a plane taking-off state on the basis of an air pressure change pattern and an acceleration change in an electronic device.

FIG. 9 is a flowchart illustrating an example of identifying a plane taking-off state on the basis of an air pressure change pattern and an acceleration change in an electronic device. The following description relates to an operation for identifying the taking-off state of the plane, such as, for example, in operation 703 of FIG. 7.

Referring to FIG. 9, in operation 901, the electronic device (e.g., the electronic device 101, 201, or 400) may identify whether a temporary air pressure increase is detected in a plane taking-off hold state. For example, the plane taking-off hold state may indicate the state 1 (600 or 650) of FIG. 6A or FIG. 6B.

In operation 903, upon detecting the temporary air pressure increase, the electronic device may determine whether an acceleration change greater than or equal to a reference level is detected in the plane taking-off hold state. For example, the reference level may indicate an acceleration change value for distinguishing an acceleration change for taking off of the plane.

If the air pressure increase is not detected in operation 901 or the acceleration change greater than or equal to the reference size is not detected in operation 903, returning to operation 901, the electronic device may re-identify whether the air pressure increase is detected.

In operation 905, upon detecting the acceleration change greater than or equal to the reference level, the electronic device may determine that the plane boarded by a user having the electronic device has taken off. For example, if the temporary air pressure increase (i.e., the first change rate) is detected due to the driving a pressurization device for the plane taking-off in the state 1 (650) of FIG. 6B and the acceleration change greater than or equal to the reference level is detected due to the plane taking off, the electronic device may determine that the plane has taken off.

According to various example embodiments, if the air pressure increase is detected in the state 1 and the acceleration change greater than or equal to the reference level is continued during the reference time, the electronic device may determine that the plane boarded by the user having the electronic device has taken off.

Figure 10:
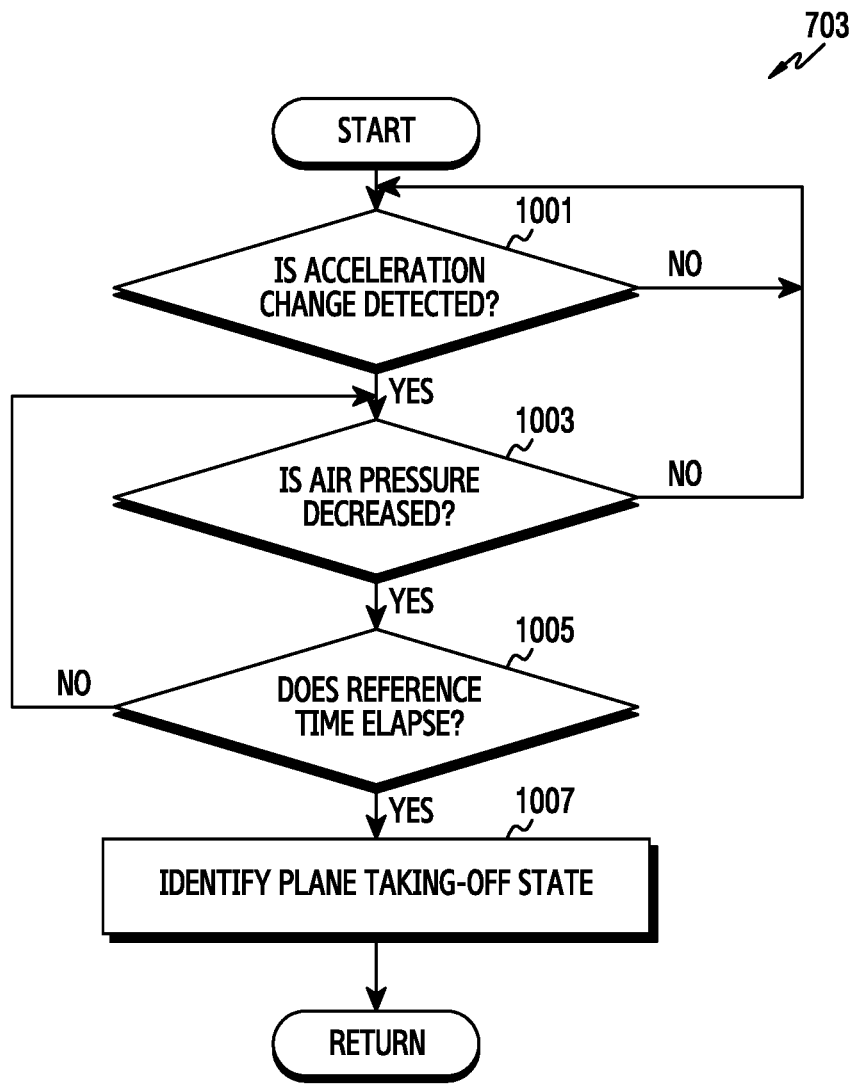
FIG. 10 is a flowchart illustrating an example of identifying a plane taking-off state on the basis of an air pressure change pattern and an acceleration change in an electronic device.

FIG. 10 is a flowchart illustrating an example of identifying a plane taking-off state on the basis of an air pressure change pattern and an acceleration change in an electronic device. The following description relates to an operation for identifying the taking-off state of the plane, such as, for example, in operation 703 of FIG. 7.

Referring to FIG. 10, in operation 1001, the electronic device (e.g., the electronic device 101, 201, or 400) may identify whether an acceleration change greater than or equal to a first reference level is detected in a plane taking-off hold state in which the air pressure change is not detected.

In operation 1003, upon detecting the acceleration change greater than or equal to the reference level, the electronic device may identify whether an air pressure decrease greater than or equal to a second reference level is detected.

If the acceleration change greater than or equal to the first reference level is not detected in operation 1001 or if the air pressure decrease greater than or equal to the second reference level is not detected in operation 1003, returning to operation 1001, the electronic device may re-identify whether the acceleration change greater than or equal to the first reference level is detected. For example, the first reference size and the second reference size may be determined on the basis of a type of the plane.

In operation 1005, upon detecting the air pressure decrease greater than or equal to the second reference size, the electronic device may identify whether a reference time elapses from a time at which the air pressure decrease occurs.

If the reference time does not elapse from the time at which the air pressure decrease occurs, returning to operation 1003, the electronic device may re-identify whether the air pressure decrease greater than or equal to the reference size is continuously detected.

In operation 1007, if the reference time elapses after the time at which the air pressure decrease occurs, the electronic device may determine that the plane boarded by a user having the electronic device has taken off. For example, after detecting the acceleration change greater than or equal to the first reference size caused by the plane taking off in operation 1001, if the air pressure decrease greater than or equal to the second reference size is continued due to an altitude increase of the plane (a first change rate), the electronic device may determine that the plane boarded by the user having the electronic device has taken off.

According to various example embodiments, upon detecting the air pressure increase in the state 1 and the acceleration change greater than or equal to the first reference level, the electronic device may identify whether the air pressure decrease greater than or equal to the second reference level is detected. If the air pressure decrease greater than or equal to the second reference level is continued during the reference time, the electronic device may determine that the plane boarded by the user having the electronic device has taken off.

Figure 11:
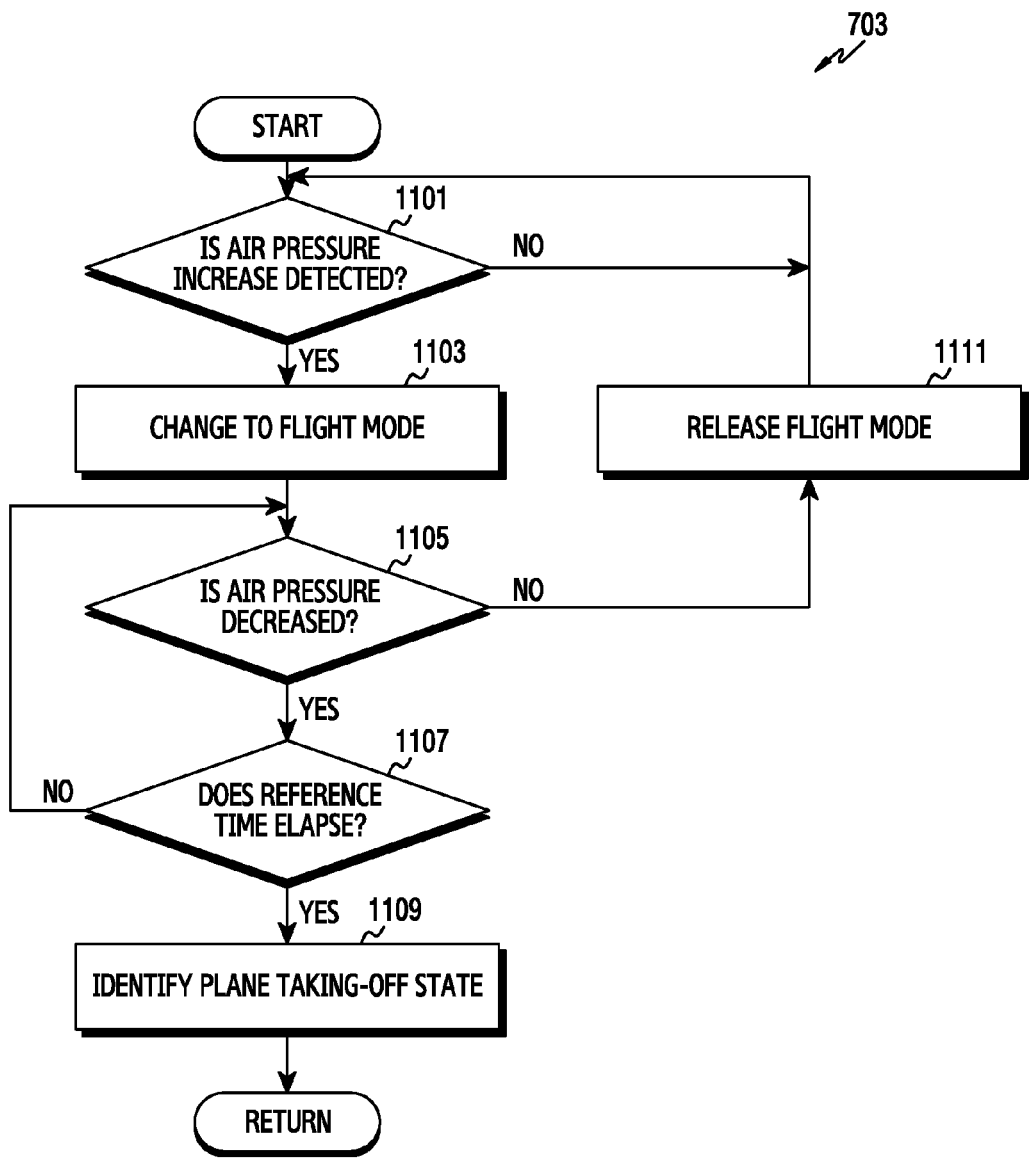
FIG. 11 is a flowchart illustrating an example of changing to a flight mode on the basis of an air pressure change pattern in an electronic device.

FIG. 11 is a flowchart illustrating an example of changing to a flight mode on the basis of an air pressure change pattern in an electronic device. The following description relates to an operation for identifying the taking-off state of the plane, such as, for example, in operation 703 of FIG. 7.

Referring to FIG. 11, in operation 1101, the electronic device (e.g., the electronic device 101, 201, or 400) may identify whether a temporary air pressure increase is detected in a state in which in-flight air pressure is constantly maintained before the taking off of the plane.

If the temporary air pressure increase is not detected, in operation 1101, the electronic device may re-identify whether the temporary air pressure increase is detected.

In operation 1103, upon detecting the temporary air pressure increase, the electronic device may change an operation mode of the electronic device to a flight mode. For example, the electronic device may determine that the in-flight air pressure is temporarily increased due to the driving of a pressurization device for plane taking off, and thus may change the operation mode of the electronic device to the flight mode.

In operation 1105, the electronic device may identify whether an air pressure decrease greater than or equal to a reference level is detected. For example, the reference level may be fixed or may be changed based on a type of the plane.

In operation 1107, the electronic device may identify whether a reference time elapses from a time at which an air pressure decrease greater than or equal to a reference level is detected. For example, the reference time may be changed based on a type and air route of the plane.

If the reference time does not elapse from the time at which the air pressure decrease greater than or equal to the reference size occurs, returning to operation 1105, the electronic device may identify whether the air pressure decrease greater than or equal to the reference level is continuously detected.

In operation 1111, if the air pressure decrease greater than or equal to the reference level is not detected, the electronic device may release the flight mode, and returning to operation 1101, may re-identify whether a temperature air pressure increase is detected.

In operation 1109, if the reference time elapses from the time at which the air pressure decrease greater than or equal to the reference level is detected, the electronic device may determine that the plane boarded by a user having the electronic device has taken off. For example, after the temporary air pressure increase occurs in the state 1 (600 or 650) of FIG. 6A or FIG. 6B, if the air pressure decrease greater than or equal to the reference level is continued during the reference time, the electronic device may determine that the plane has taken off.

Figure 12:
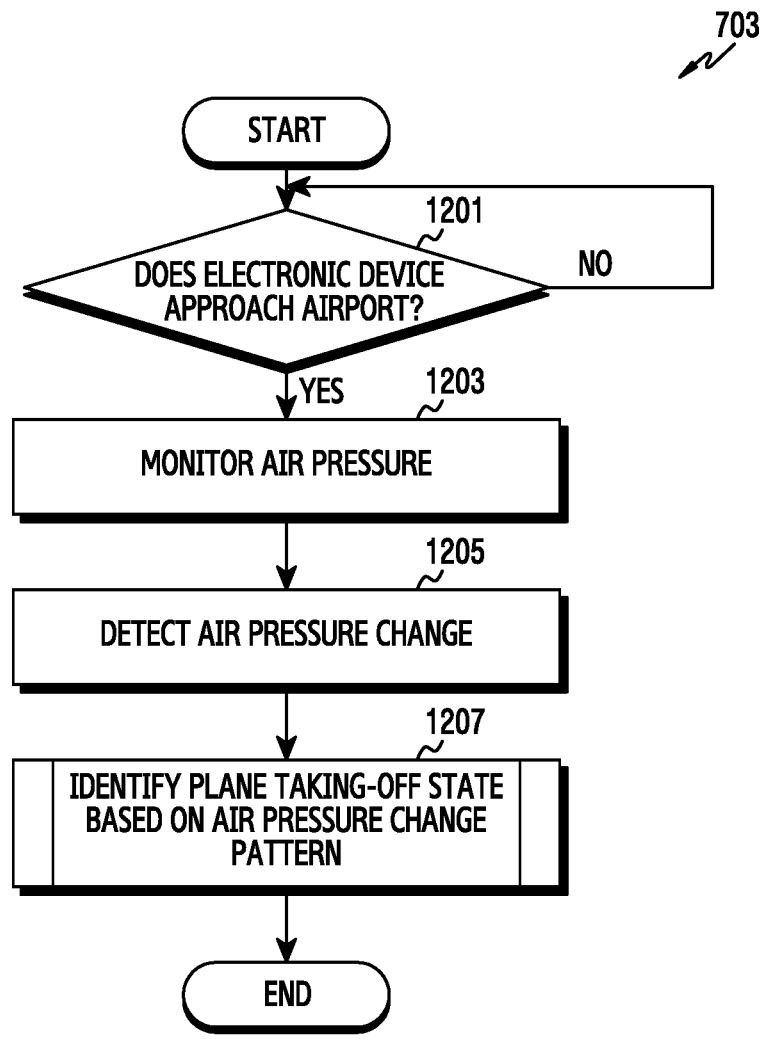
FIG. 12 is a flowchart illustrating an example of monitoring an air pressure change on the basis of a geofence service in an electronic device.

FIG. 12 is a flowchart illustrating an example of monitoring an air pressure change based on a geofence service in an electronic device.

Referring to FIG. 12, in operation 1201, the electronic device (e.g., the electronic device 101, 201, or 400) may identify whether the electronic device approaches an airport on the basis of a geofence function. For example, the electronic device may identify whether a geofence assigned to the airport is detected through radio signal scanning of WLAN (e.g., WiFi, LiFi) or Bluetooth.

In operation 1203, upon identifying the airport approaching on the basis of the geofence function, the electronic device may monitor air pressure. In response to the airport approaching, the electronic device may monitor the air pressure by activating an air pressure sensor of the sensor module 460.

In operation 1205, the electronic device may detect an air pressure change by using the air pressure sensor. For example, the electronic device may detect an air pressure change caused by the driving of a pressurization device and taking off of a plane in a taking-off hold state of the plane.

In operation 1207, the electronic device may identify a taking-off state of the plane on the basis of an air pressure change pattern. For example, the electronic device may determine that the plane has taken off on the basis of at least one of an air pressure change pattern and an acceleration value as illustrated in FIG. 8, FIG. 9, or FIG. 10.

According to an example embodiment, upon determining the taking-off of the plane boarded by a user having the electronic device, the electronic device may provide an in-flight service information.

Figure 13:
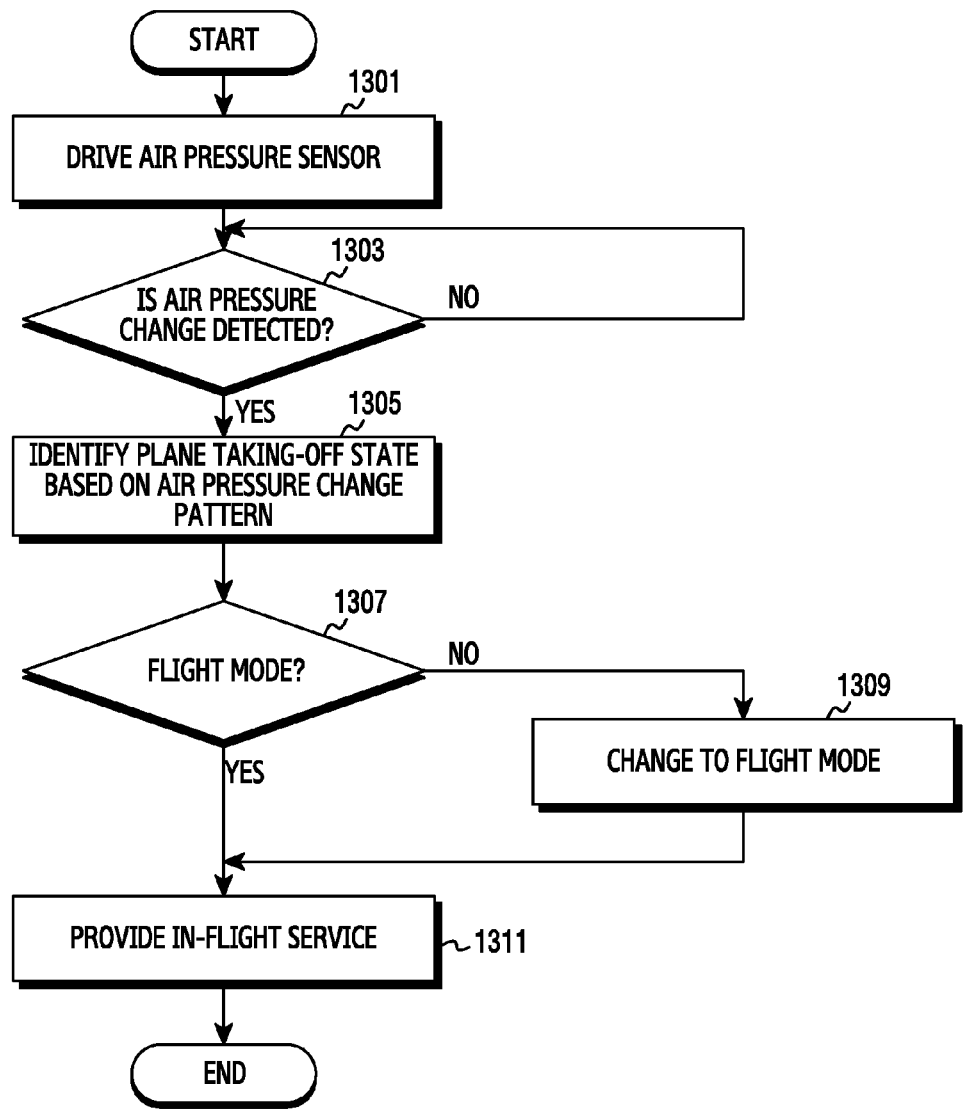
FIG. 13 is a flowchart illustrating an example of changing to a flight mode on the basis of a plane taking-off state in an electronic device.

FIG. 13 is a flowchart illustrating an example of changing to a flight mode on the basis of a plane taking-off state in an electronic device.

Referring to FIG. 13, in operation 1301, the electronic device (e.g., the electronic device 101 or 201 or 400) may drive an air pressure sensor. For example, if airport approaching is recognized on the basis of a geofence function, the electronic device may drive the air pressure sensor. For example, the electronic device may identify whether the air pressure sensor is activated on the basis of input information detected through the input module 440 (e.g., the input interface 150).

In operation 1303, the electronic device may identify whether an air pressure change is detected through the air pressure sensor.

If the air pressure change is not detected, in operation 1303, the electronic device may re-identify whether the air pressure change is detected. According to an example embodiment, if the air pressure change is not detected during a specific time, the electronic device may deactivate the air pressure sensor.

In operation 1305, upon detecting the air pressure change, the electronic device may identify a taking-off state of a plane on the basis of an air pressure change pattern. For example, as illustrated in FIG. 8, the electronic device may determine that the plane has taken off on the basis of the air pressure change pattern corresponding to a continuous air pressure decrease after a temporary air pressure increase occurs. For example, as illustrated in FIG. 9, the electronic device may determine that the plane has taken off on the basis of a temporary air pressure increase and an acceleration change. For example, as illustrated in FIG. 10, the electronic device may determine that the plane has taken off on the basis of a continuous air pressure decrease after detecting an acceleration change greater than or equal to a reference level.

In operation 1307, the electronic device may identify whether an operation mode of the electronic device is set to a flight mode.

In operation 1309, if the operation mode of the electronic device is not set to the flight mode, the electronic device may change the operation mode of the electronic device to the flight mode. For example, the electronic device may change to the flight mode for deactivating at least one function (e.g., a wireless communication function) capable of having an effect on a flight of the plane.

In operation 1311, in case of being set to the flight mode, the electronic device may provide an in-flight service information. For example, the electronic device may provide at least one of flight information, exercise information, in-flight environment information, in-flight duty free product information, mean menu information, in-flight safety guide information, and information on how to fill out an arrival document.

FIG. 14A to FIG. 14G are diagrams illustrating example screen configurations for providing an in-flight service or in-flight service information in an electronic device.

Figure 14A:
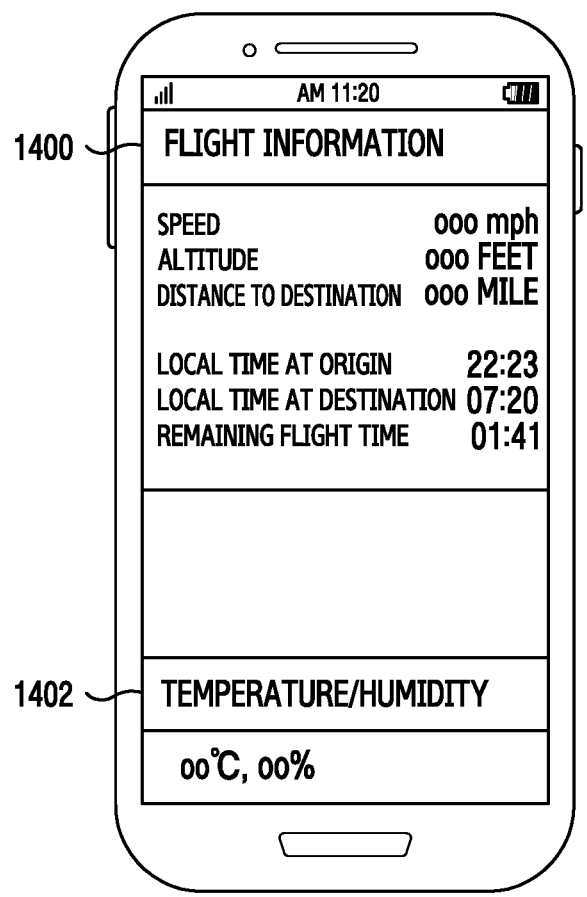
FIG. 14A to FIG. 14G are diagrams illustrating example screen configurations displaying and providing example in-flight service in an electronic device.

Referring to FIG. 14A, the electronic device may display flight information 1400 and in-flight environment information 1402 determined based on destination information of a plane. For example, the electronic device may extract the destination information of the plane from ticketing information of a user, or may identify destination information determined by input information detected through the input module 440. For example, the flight information 1400 may include a departure time, arrival time, remaining flight time, flight speed, flight altitude, distance to the destination, or the like of the plane. The in-flight environment information 1402 may include an in-flight temperature, humidity, air pressure, or the like.

Figure 14B:
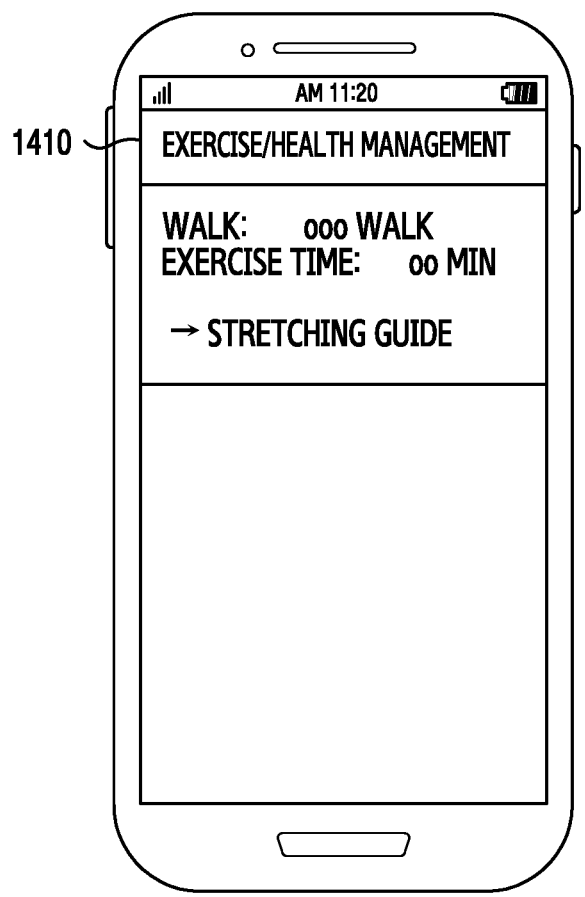

Referring to FIG. 14B, the electronic device may display exercise information 1410 for in-flight health management of the user. For example, the electronic device may estimate an amount of user's in-flight movement on the basis of movement information of the electronic device. The electronic device may display the exercise information 1410 regarding an exercise that can be done in the plane on the basis of the amount of user's movement. For example, if the user's movement less than or equal to a reference movement amount and is continued for a time greater than or equal to a reference time, the electronic device may display the exercise information 1410.

Figure 14C:
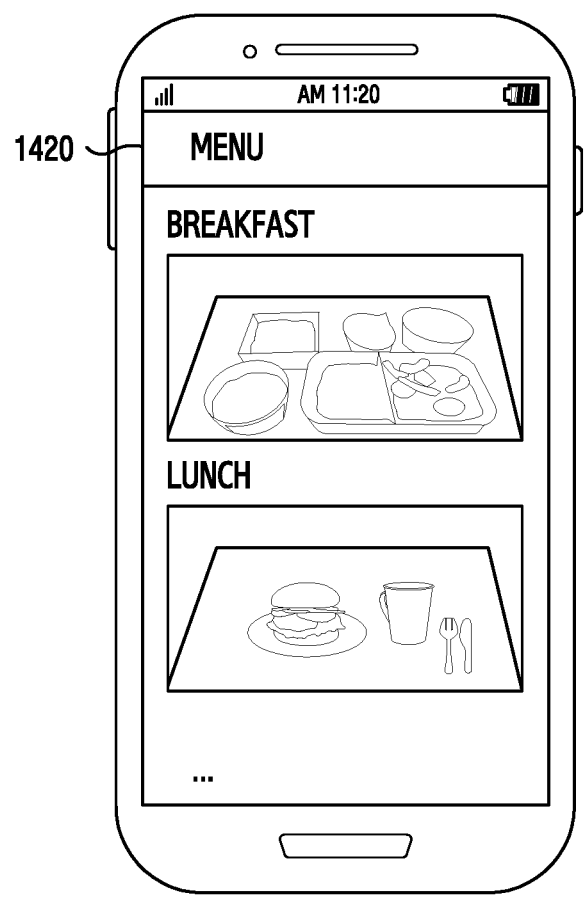

Referring to FIG. 14C, the electronic device may display menu information 1420 of an in-flight meal. For example, when a time of providing a meal arrives on the basis of a flight time of the plane, the electronic device may display in-flight menu information.

Figure 14D:
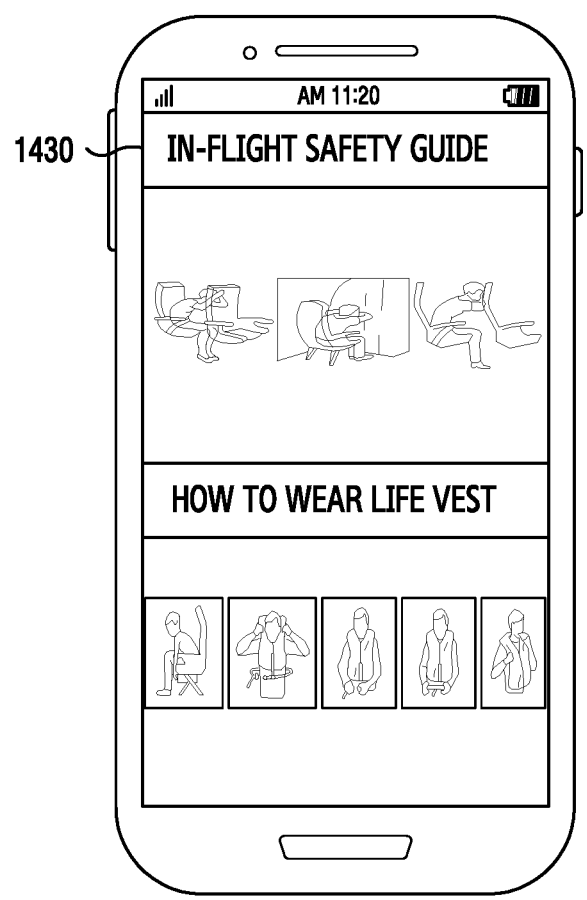

Referring to FIG. 14D, the electronic device may display in-flight safety guide information 1430 such as how to wear a life vest, how to escape in an emergency situation, or the like. For example, when it is determined that the plane has taken off, the electronic device may display the in-flight safety guide information 1430. For example, if an unstable air current state is detected on the basis of shaking of the plane, the electronic device may display the in-flight safety guide information 1430.

Figure 14E:
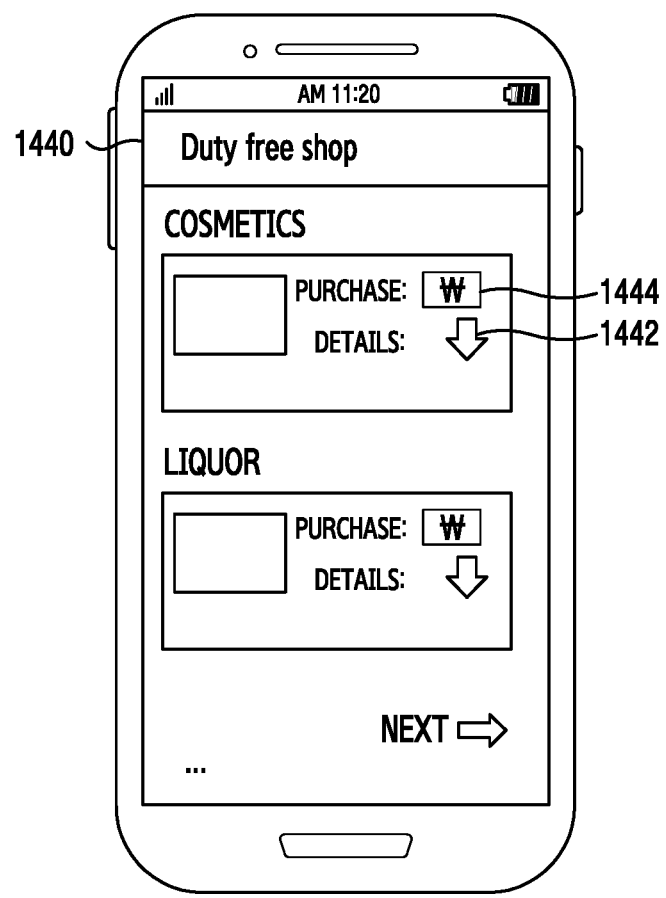

Referring to FIG. 14E, the electronic device may display in-flight duty free product information 1440. For example, the electronic device may display summary information (e.g., thumbnail) of a duty free product that can be purchased inside the plane (1440). If it is detected that a menu "details" 1442 is selected through the input module 440, the electronic device may display details of the duty free product. If it is detected that a menu "purchase" 1444 is selected through the input module 440, the electronic device may transmit purchase request information to a shop in which the duty free product is purchased.

Figure 14F:
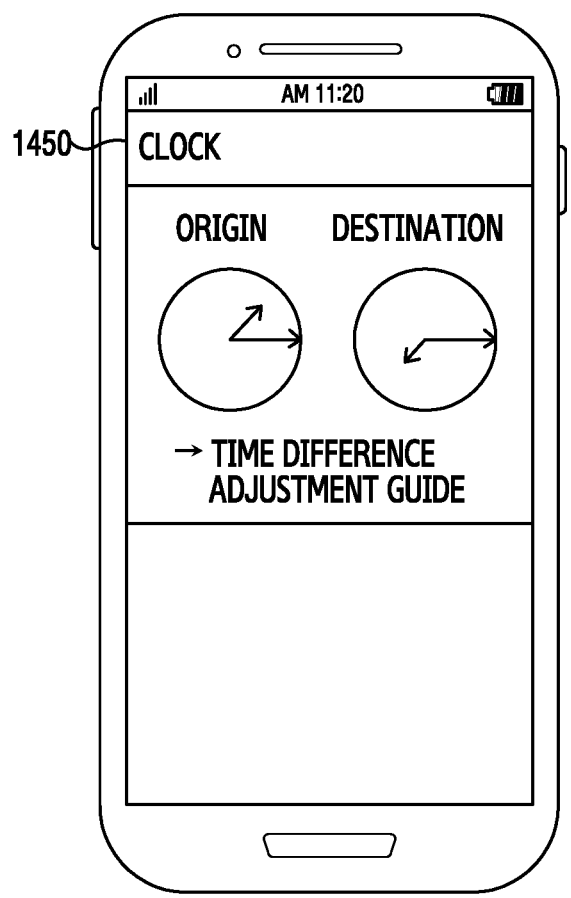

Referring to FIG. 14F, the electronic device may display time difference information 1450 of an origin and destination of the plane. For example, the electronic device may display local time information of the origin and local time information of the destination of the plane.

Figure 14G:
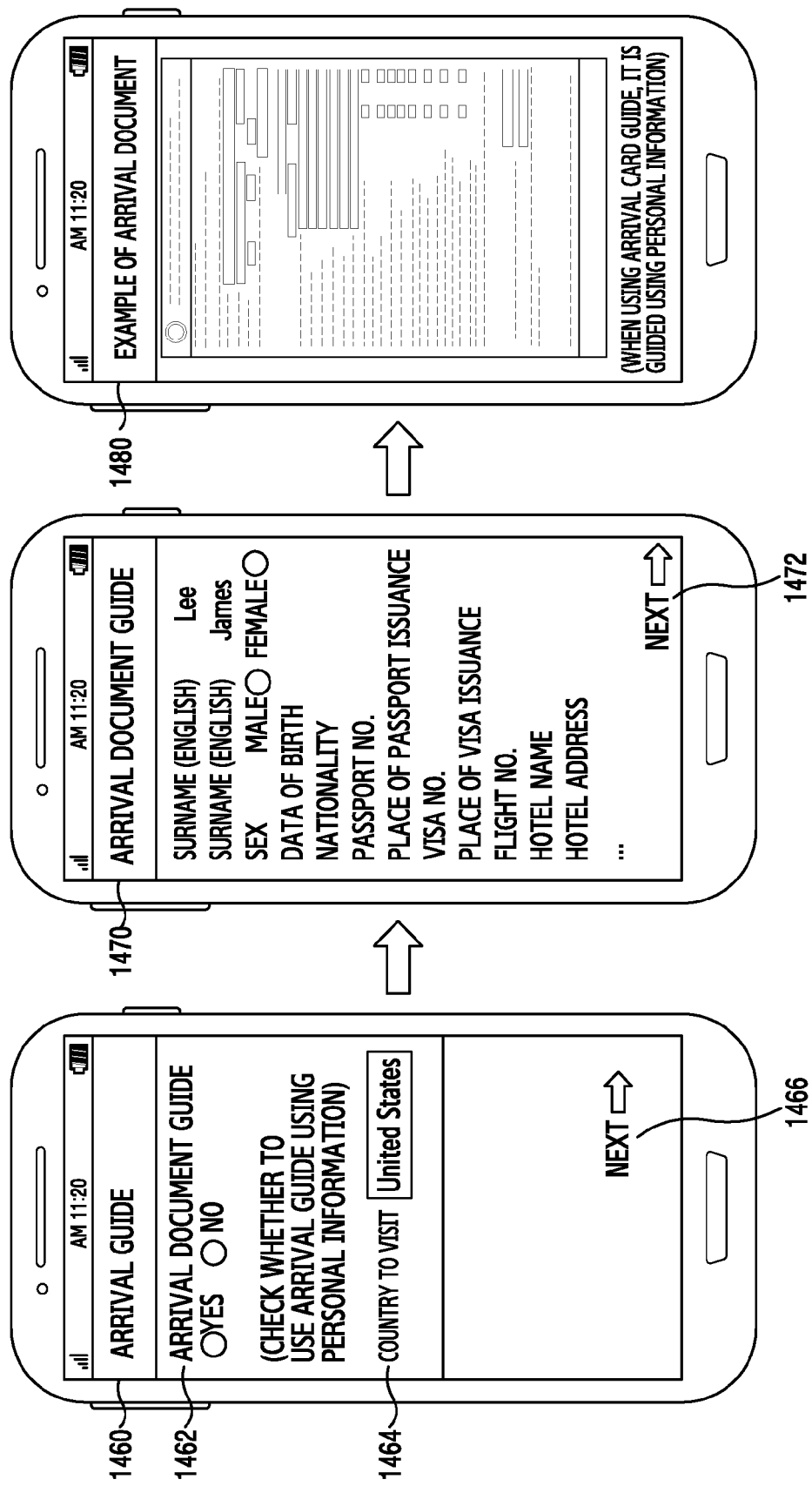

Referring to FIG. 14G, the electronic device may display information on how to fill out an arrival document for the destination of the plane. For example, the electronic device may display an arrival document guide service screen 1460. The arrival card guide service screen 1460 may include a menu 1462 for determining whether to use an arrival document guide service and a menu 1464 for selecting a country of arrival. If it is detected that a menu "next" 1466 is selected in a state in which it is determined to use the arrival document guide service and in which the country of arrival is selected, the electronic device may display an input screen 1470 of user information to be filled out on the arrival document. If it is detected that a "next" menu 1472 is detected in the input screen 1470 of the user information, the electronic device may recognize that an input of the input screen 1470 of the user information is complete and thus may display an arrival document 1480, to which the user information is applied, of a corresponding country.

Figure 15:
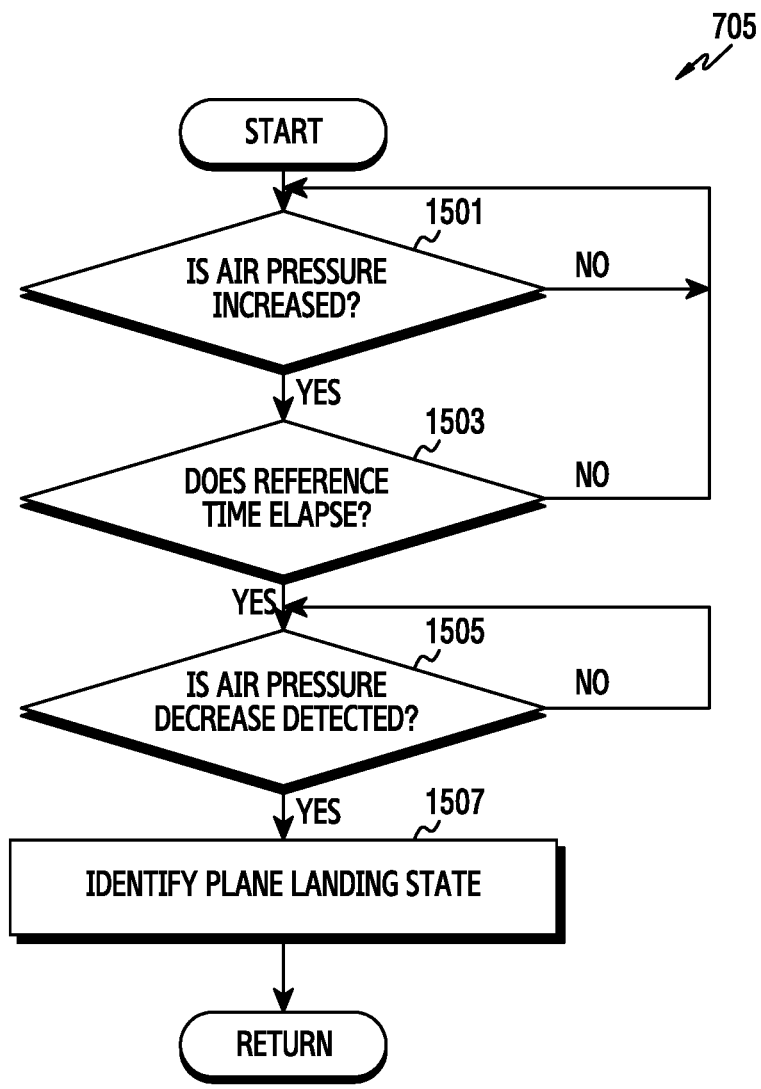
FIG. 15 is a flowchart illustrating an example of identifying a plane landing state on the basis of an air pressure change pattern in an electronic device.

FIG. 15 is a flowchart illustrating an example of identifying a plane landing state on the basis of an air pressure change pattern in an electronic device. The following description relates to an operation for identifying a landing state of a plane, such as, for example, in operation 705 of FIG. 7

Referring to FIG. 15, in operation 1501, the electronic device (e.g., the electronic device 101 or 201 or 400) may identify whether an air pressure increase greater than or equal to a reference level is detected. For example, the electronic device may identify whether the air pressure increase greater than or equal to the reference level is detected due to an altitude decrease of the plane during a plane cruising state (e.g., the state 3 (654)) in which an in-flight air pressure change is small as illustrated in FIG. 6B.

If the air pressure increase greater than or equal to the reference size is not detected, in operation 1501, the electronic device may re-identify whether the air pressure increase greater than or equal to the reference size is detected.

In operation 1503, upon detecting the air pressure increase greater than or equal to the reference level, the electronic device may identify whether a reference time elapses from a time at which the air pressure increase is detected. For example, the reference time may be determined on the basis of a type or air route of the plane.

If the reference time does not elapse from the time at which the air pressure increase is detected, returning to operation 1501, the electronic device may identify whether the air pressure increase greater than or equal to the reference size is continued.

In operation 1505, if the air pressure increase greater than or equal to the reference level is continued, the electronic device may recognize this as a landing hold state and may identify whether an air pressure decrease is detected.

If the air pressure decrease is not detected in the landing hold state, in operation 1505, the electronic device may re-identify whether the air pressure decrease is detected.

In operation 1507, if the air pressure decrease is detected in the landing hold state, the electronic device may determine that the plane has landed. For example, as illustrated in FIG. 6B, if the air pressure decrease greater than or equal to the reference size is continuously detected during the reference time, the electronic device may recognize this as an altitude decrease for landing of the plane and thus recognizes this as the landing hold state. Upon detecting the air pressure decrease in the landing hold state (656), the electronic device may recognize that in-flight air pressure is decreased to this air pressure because a door of the plane is open, and thus may determine that the plane has landed.

According to various example embodiments, if the air pressure increase greater than or equal to the reference size is detected in the landing hold state, the electronic device may recognize this as an air pressure change caused by an air route change and thus may release the landing hold state.

Figure 16:
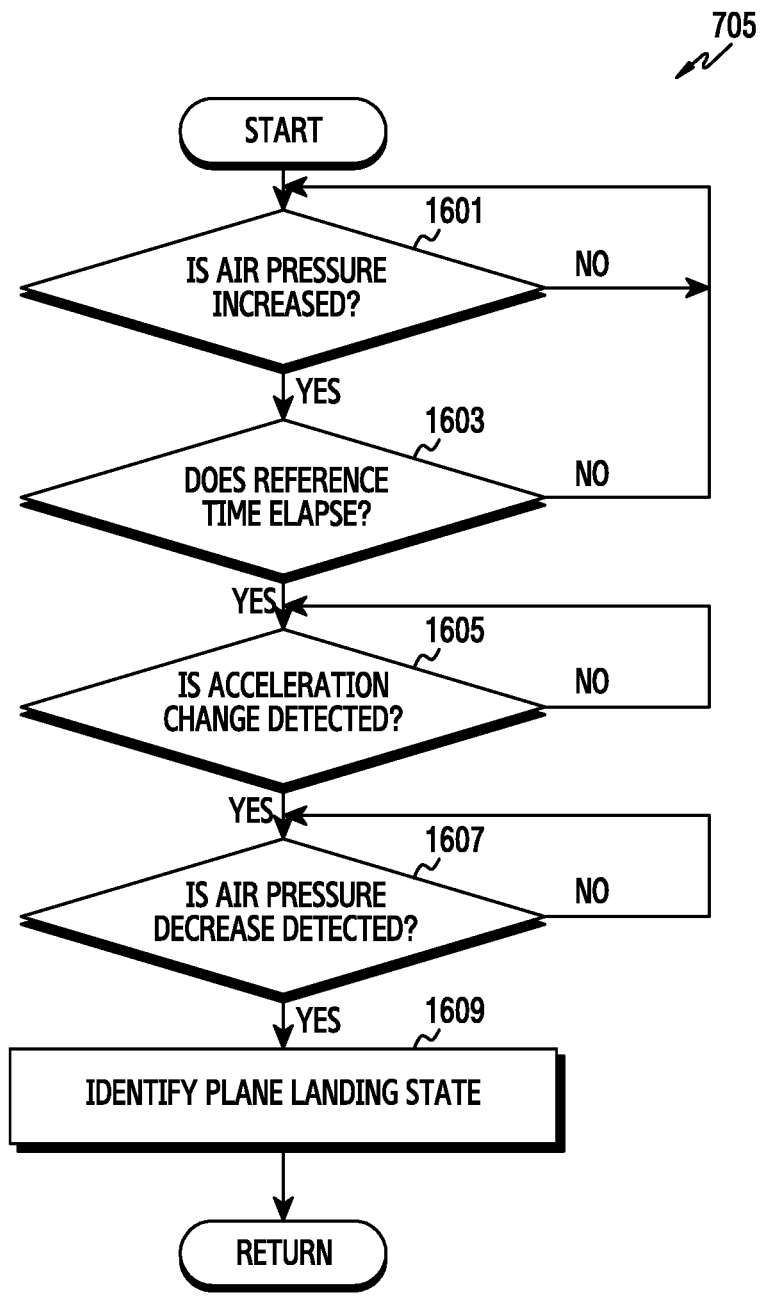
FIG. 16 is a flowchart illustrating an example of identifying a plane landing state on the basis of an air pressure change pattern and an acceleration change in an electronic device according to various exemplary embodiments of the present invention.

FIG. 16 is a flowchart illustrating an example of identifying a plane landing state on the basis of an air pressure change pattern and an acceleration change in an electronic device. The following description relates to an operation for identifying a landing state of a plane, such as, for example, in operation 705 of FIG. 7.

Referring to FIG. 16, in operation 1601, the electronic device (e.g., the electronic device 101 or 201 or 400) may identify whether an air pressure increase greater than or equal to a first reference level is detected. For example, the electronic device may identify whether the air pressure increase greater than or equal to the first reference level is detected in the state 2 (610) in which in-flight air pressure is constantly maintained due to plane cruising as illustrated in FIG. 6A.

If the air pressure increase greater than or equal to the first reference level is not detected, in operation 1601, the electronic device may re-identify whether the air pressure increase greater than or equal to the first reference level is detected.

In operation 1603, if the air pressure increase greater than or equal to the first reference level is detected, the electronic device may identify whether a reference time elapses from a time at which the air pressure increase is detected. For example, the reference time may be fixed or may be changed based on a type and air route of the plane.

If the reference time does not elapse from the time at which the air pressure increase is detected, returning to operation 1601, the electronic device may identify whether the air pressure increase greater than or equal to the first reference level is continued.

In operation 1605, if the air pressure increase greater than or equal to the first reference size is continued, the electronic device may recognize this as a landing hold state and may identify whether an acceleration change greater than or equal to the second reference level is detected.

If the acceleration change greater than or equal to the second reference level is not detected in the landing hold state, in operation 1605, the electronic device may re-identify whether the acceleration change greater than or equal to the second reference size is detected.

In operation 1607, if the acceleration change greater than or equal to the second reference level is detected, the electronic device may identify whether an air pressure decrease is detected.

After detecting the acceleration change greater than or equal to the second reference level, if the air pressure decrease is not detected, in operation 1607, the electronic device may re-identify whether the air pressure decrease is detected.

In operation 1609, upon detecting the air pressure decrease, the electronic device may determine that the plane has landed. For example, if the air pressure decrease greater than or equal to the first reference size is continuously detected during the reference time, the electronic device may recognize this as an altitude decrease for landing of the plane and thus recognizes this as the landing hold state. Upon detecting an acceleration change greater than or equal to the second reference size in the landing hold state, the electronic device may determine that the plane has landed on a runway. Thereafter, upon detecting the air pressure decrease, the electronic device may recognize that in-flight air pressure is decreased to this air pressure because a door of the plane is open, and thus may determine that the plane has landed.

According to various example embodiments, upon identifying the landing state of the plane, the electronic device may release the flight mode, and may provide a location-based service corresponding to landing of the plane as illustrated in FIG. 17A to FIG. 17D.

FIG. 17A to FIG. 17D are diagrams illustrating example screen configurations of a service corresponding to a plane landing state in an electronic device.

Figure 17A:
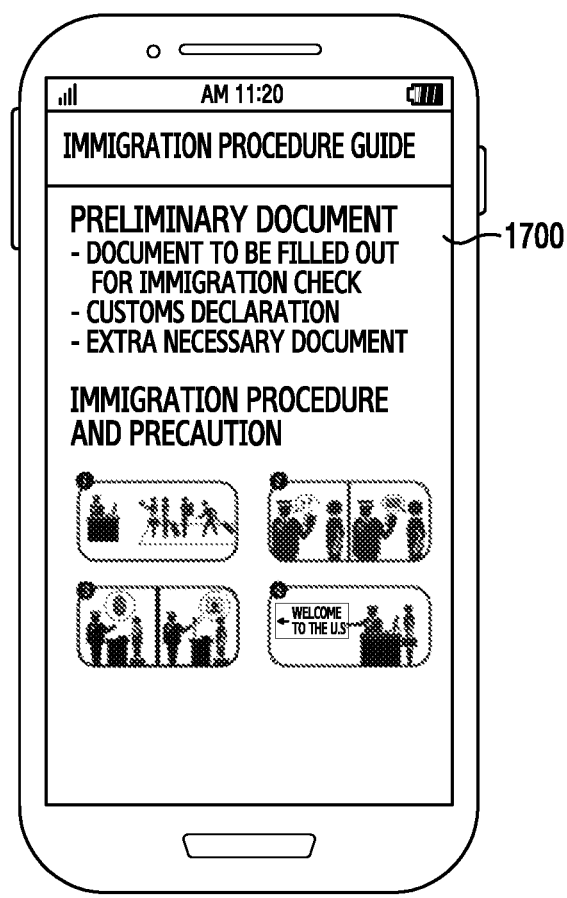
FIG. 17A to FIG. 17D are diagrams illustrating example screen configurations displaying an example service corresponding to a plane landing state in an electronic device.

Referring to FIG. 17A, upon determining landing of a plane, the electronic device (e.g., the electronic device 101 or 201 or 400) may display guide information 1700 for an immigration check. For example, the electronic device may identify a country in which the plane has landed. If the plane has landed in a country different from an origin, the electronic device may display immigration check guide information (e.g., the display 160 or 430). For example, the immigration check guide information may include at least one of an immigration procedure and an immigration checkpoint location.

Figure 17B:

Referring to FIG. 17B, the electronic device may display conversation information for the immigration procedure. For example, the electronic device may execute a translator 1710 so that a user can check a conversation required for the immigration procedure. In this example, the electronic device may execute a translator corresponding to a language of a country in which the plane has landed. In addition, the electronic device may display a conversation example 1720 for the immigration procedure. In this example, the electronic device may display a conversation example corresponding to the language of the country in which the plane has landed.

Figure 17C:
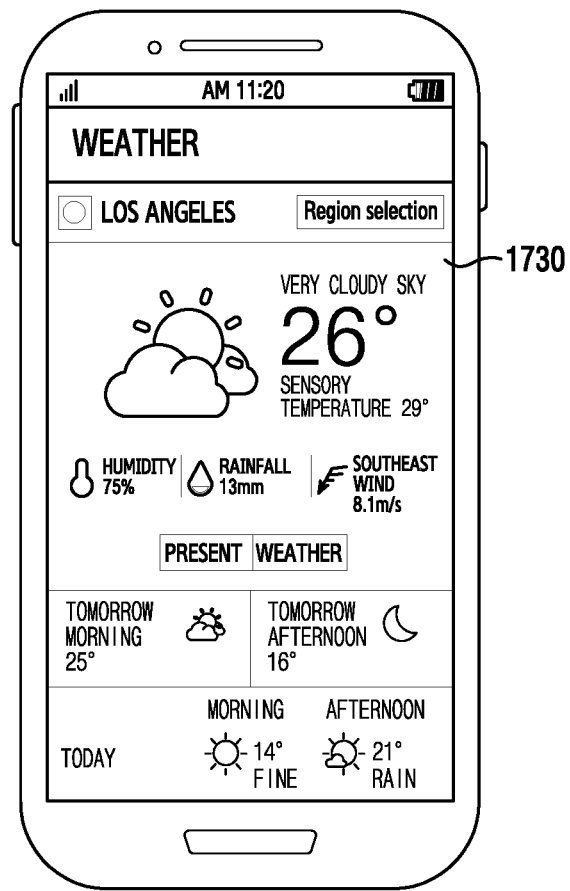

Referring to FIG. 17C, upon determining the landing of the plane, the electronic device may display weather information 1730 of a region in which the plane has landed. For example, if it is determined that the plane has landed, the electronic device may detect a location (e.g., a city) of an airport in which the plane has landed. The electronic device may access to a weather server to acquire weather information of the region, and may display the information on a display (e.g., the display 160 or 430).

Figure 17D:
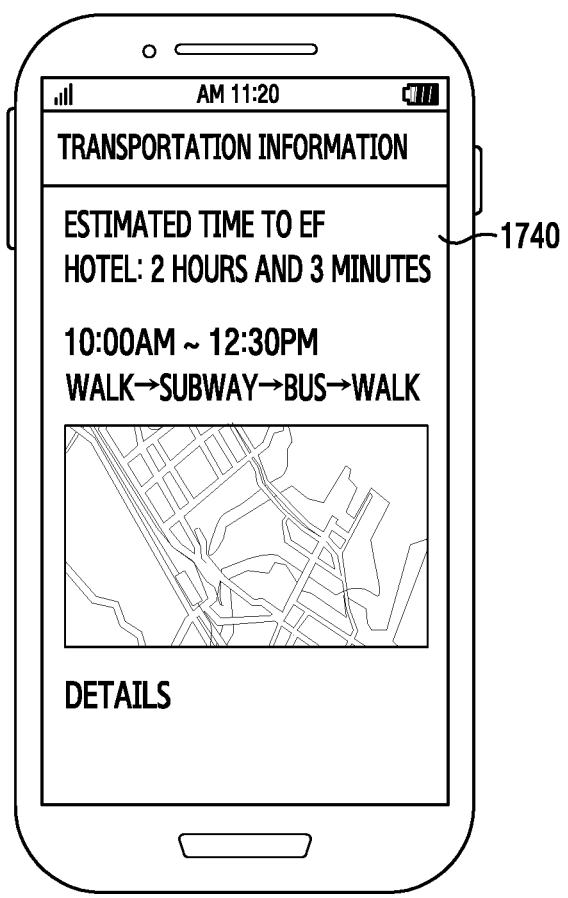

Referring to FIG. 17D, upon determining the landing of the plane, the electronic device may display transportation information 1740 of an accommodation reserved by a user. For example, upon determining the landing of the plane, the electronic device may detect a location (e.g., a country and a city) of the airport in which the plane has landed. The electronic device may display transportation information indicating transportation from the location of the airport to the accommodation which is input by the user. For example, transportation information 1740 may include at least one of a transportation means, estimated time, estimated price, transfer information, and the like from the airport to the accommodation.

According to various example embodiments, the electronic device may provide a location-based service regarding a country or city in which the plane has landed as illustrated in FIG. 18A to FIG. 18F.

FIG. 18A to FIG. 18F are diagrams illustrating example screen configurations of a service for a travel in an electronic device.

Figure 18A:
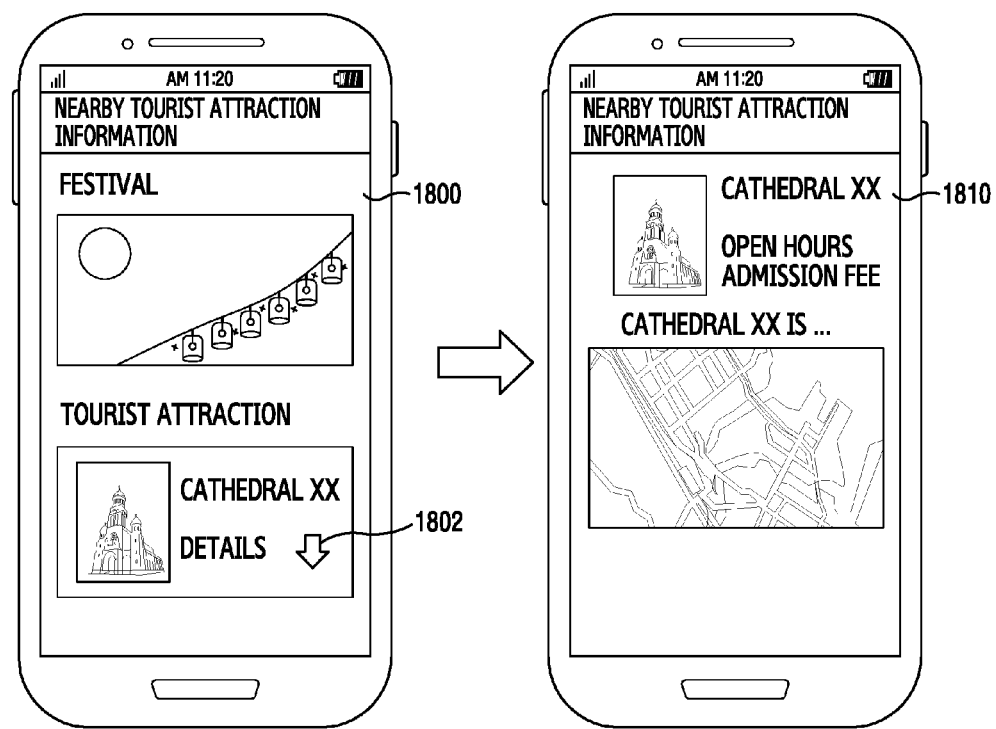
FIG. 18A to FIG. 18F are diagrams illustrating example screen configurations displaying an example service for a travel in an electronic device.

Referring to FIG. 18A, the electronic device (e.g., the electronic device 101 or 201 or 400) may display nearby tourist attraction information 1800 of a region (e.g., a city) in which a plane has landed. For example, the electronic device may display summary information 1800 of the region in which the plane has landed. If it is detected that a detailed guide menu 1802 regarding a specific tourist attraction (e.g., "cathedral XX") is selected, the electronic device may display details 1810 of the specific tourist attraction.

Figure 18B:
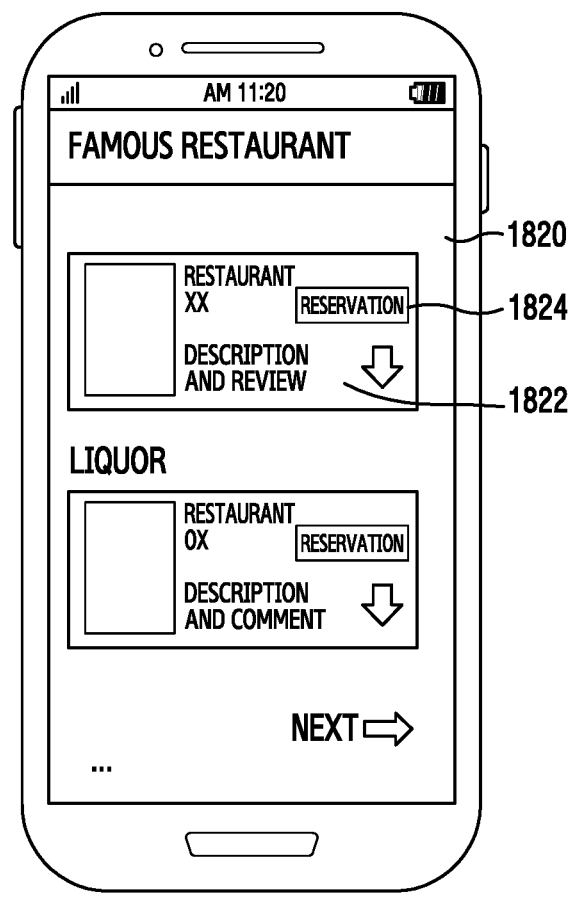

Referring to FIG. 18B, the electronic device may display nearby famous restaurant information 1820 of the region (e.g., the city) in which the plane has landed. For example, the electronic device may display summary information 1820 of the famous restaurant chosen in the region in which the plane has landed. If it is detected that a "description and review" menu 1822 regarding a specific famous restaurant (e.g., "restaurant XX") is selected, the electronic device may display details of the specific famous restaurant. If it is detected that a "reservation" menu 1824 regarding the specific famous restaurant (e.g., "restaurant XX") is detected, the electronic device may provide a reservation service for accessing a website of the famous restaurant or for connecting a call to the famous restaurant.

Figure 18C:
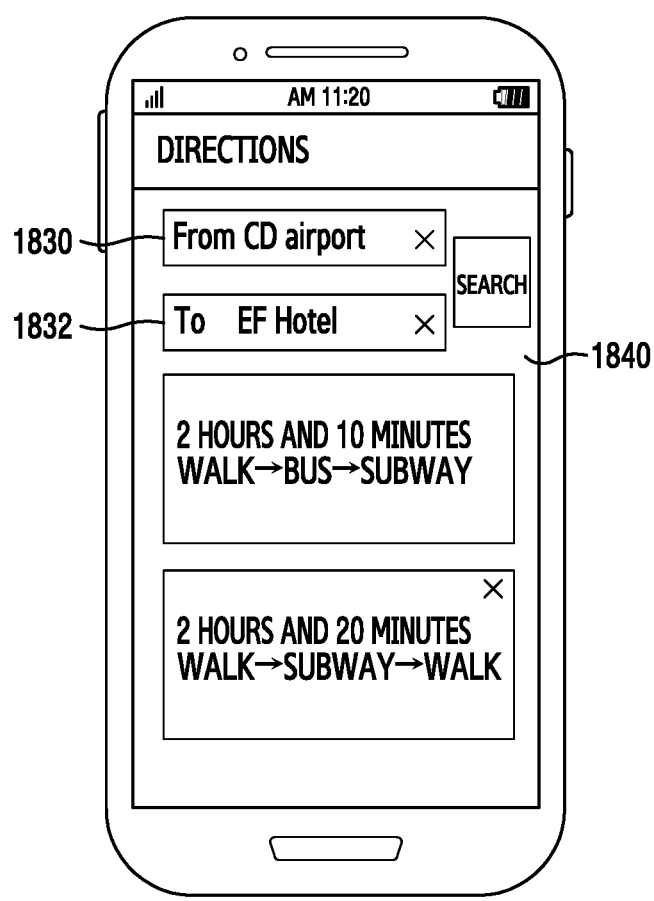

Referring to FIG. 18C, the electronic device may provide a transportation search service regarding the region (e.g., the city or the country) in which the plane has landed. For example, the electronic device may display transportation information 1840 from an origin 1830 to a destination 1832 determined on the basis of input information detected through the input module. For example, transportation information 1840 may include at least one of a transportation means, estimated time, estimated price, transfer information, and the like from an airport to an accommodation.

Figure 18D:
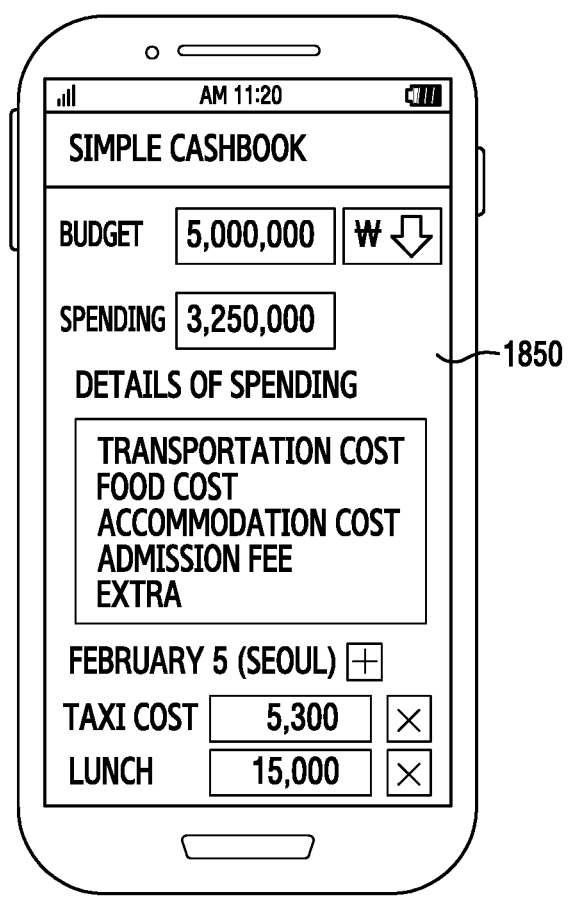

Referring to FIG. 18D, the electronic device may provide an account book service required when traveling the region (e.g., the city or the country) in which the plane has landed. For example, the electronic device may display budget and spending details 1850 to a display on the basis of input information detected through the input module.

Figure 18E:
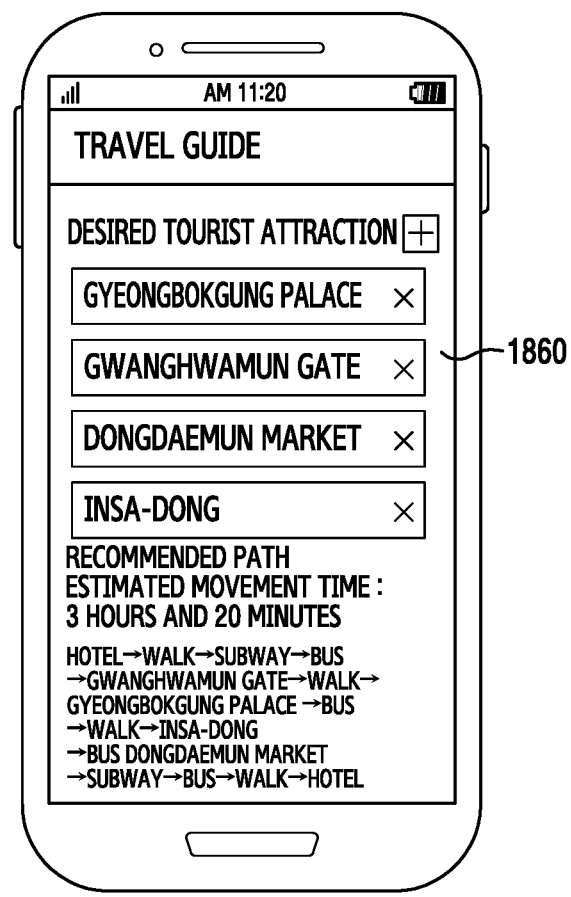

Referring to FIG. 18E, the electronic device may provide travel guide information 1860 regarding the region (e.g., the city or the country) in which the plane has landed. For example, the electronic device may display movement path information 1860 corresponding to a user's travel schedule to the display. For example, the movement path information 1860 may include an estimated movement time, a transportation means, or the like.

Figure 18F:
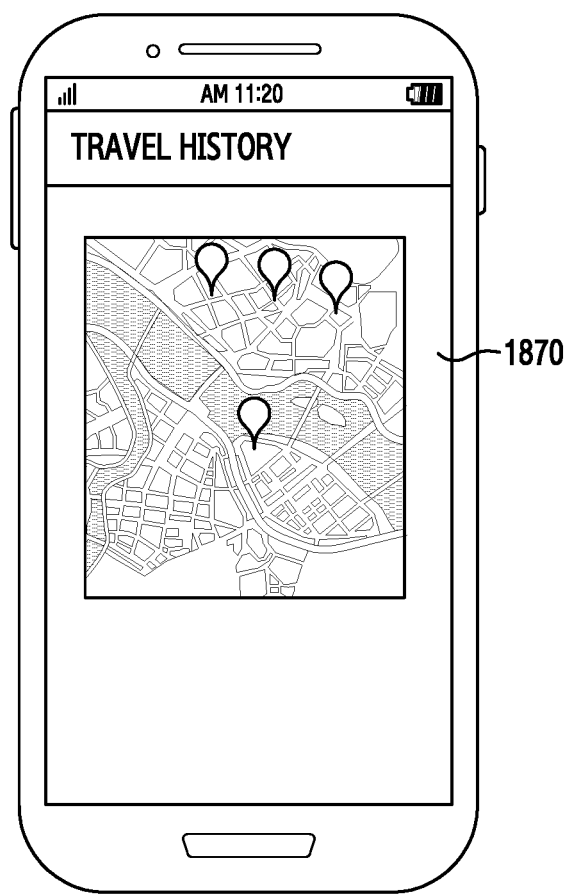

Referring to FIG. 18F, the electronic device may provide a travel history service regarding the region (e.g., the city or the country) in which the plane has landed. For example, the electronic device may indicate tourist attraction information determined by input information detected through the input module 440 (1870). For example, the electronic device may indicate on a map a location at which the electronic device is located more than a reference time (1870).

According to an example embodiment, the electronic device may provide an alarm setting function for a travel schedule, a return time of a lent product, or the like.

Figure 19:
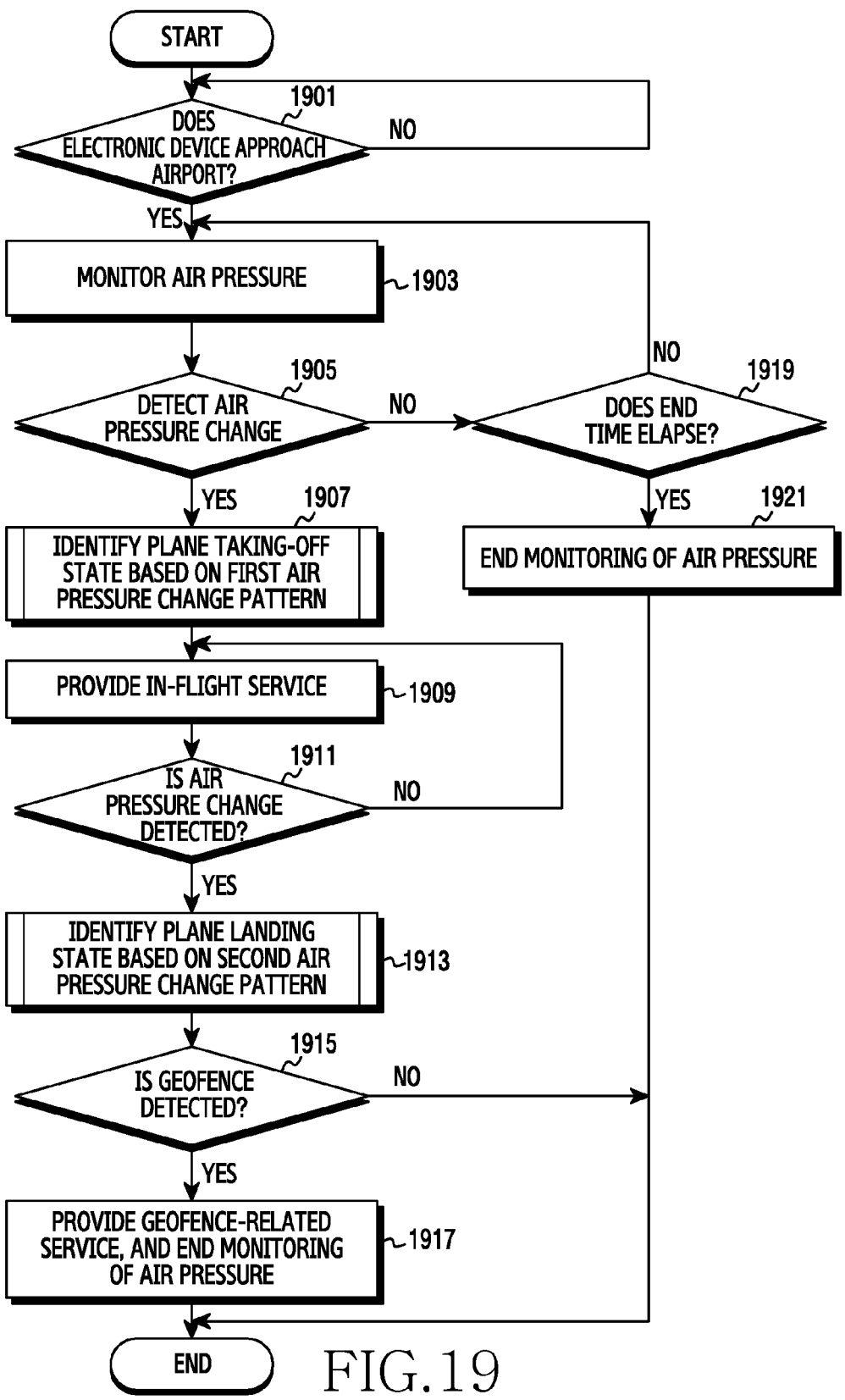
FIG. 19 is a flowchart illustrating an example of providing a service corresponding to an air pressure change in an electronic device.

FIG. 19 is a flowchart illustrating an example of providing a service corresponding to an air pressure change in an electronic device.

Referring to FIG. 19, in operation 1901, the electronic device (e.g., the electronic device 101 or 201 or 400) may identify whether the electronic device approaches an airport (i.e., a first geofence) on the basis of a geofence function. For example, the electronic device may identify whether the first geofence assigned to the airport is detected through a radio signal scan by using a WLAN (e.g., WiFi, LiFi) and/or Bluetooth module.

In operation 1903, upon identifying the airport approaching (i.e., the first geofence) based on the geofence function, the electronic device may monitor air pressure. If an airport geofence is detected as illustrated in the state 1 (650) of FIG. 6B, the electronic device may monitor the air pressure by activating an air pressure sensor of the sensor module 460. In addition, the electronic device may provide a service related to the first geofence in the state 1 (650). For example, the electronic device may perform at least one of an airport geofence related function operation, an application operation, and a mode change.

In operation 1905, the electronic device may identify whether an air pressure change is detected. For example, the electronic device may identify whether the air pressure change 500 or 520 of FIG. 5A or FIG. 5B is detected due to the driving of a pressurization device and taking off of the plane in the state 1 (650) of FIG. 6B.

In operation 1919, if the air pressure change is not detected, the electronic device may identify whether a pre-determined time elapses to end monitoring of the air pressure from a time at which the monitoring of the air pressure starts.

If the pre-determined time does not elapse, returning to operation 1903, the electronic device may monitor the air pressure.

In operation 1921, if the pre-determined time elapses, the electronic device may end the monitoring of the air pressure. For example, the electronic device may deactivate the air pressure sensor of the sensor module 460.

In operation 1907, if the air pressure change is detected, the electronic device may identify a taking-off state of the plane on the basis of an air pressure change pattern. For example, the electronic device may determine that the plane has taken off on the basis of at least one of an air pressure change pattern and an acceleration value as shown in FIG. 8, FIG. 9, or FIG. 10. For example, if the air pressure change is detected in the state 1 (650) of FIG. 6B, the electronic device may determine the state 2 (652) in which the plane has taken off. Upon determining the state 2 (652), the electronic device may deactivate a cellular module. In addition, the electronic device may stop scanning of WLAN (e.g., WiFi, LiFi) or Bluetooth for a geofence service.

In operation 1909, the electronic device may provide an in-flight service information. For example, upon determining the state 3 (654) of FIG. 6B, the electronic device may provide the in-flight service information. For example, if in-flight air pressure is constantly maintained in the state 3 (654) of FIG. 6B, the electronic device may provide the in-flight service.

In operation 1911, the electronic device may identify whether an air pressure change is detected. For example, the electronic device may identify whether the air pressure change 512, 524, or 526 of FIG. 5A or FIG. 5B is detected due to the landing of the plane in the state 3 (654) of FIG. 6B.

If the air pressure change is not detected, returning to operation 1909, the electronic device may continue to provide the in-flight service including, for example, in-flight information.

In operation 1913, if the air pressure change is detected, the electronic device may identify the landing state of the plane on the basis of the air pressure change pattern. For example, the electronic device may determine that the plane has landed on the basis of at least one of the air pressure change and the acceleration value of FIG. 15 of FIG. 16. For example, if the air pressure change is detected in the state 3 (654) of FIG. 6, the electronic device may determine the state 4 (656) in which the plane has landed. Upon determining the state 4 (656), the electronic device may activate a communication module (e.g., a cellular module, a WLAN (e.g., WiFi, LiFi) module, or a Bluetooth module) deactivated in the state 2 (652).

In operation 1915, the electronic device may identify whether a geofence (i.e., a second geofence) is detected. For example, the electronic device may identify whether a radio signal assigned for the second geofence is detected by using a WLAN (e.g., WiFi, LiFi) module or Bluetooth module activated in the state 4 (656) of FIG. 6B.

In operation 1917, if the geofence (i.e., the second geofence) is detected, the electronic device may provide a service related to the second geofence and may end the monitoring of the air pressure. For example, the electronic device may perform at least one of a second geofence related function operation, an application operation, and a mode change. For example, the electronic device may deactivate the air pressure sensor of the sensor module 460.

According to various example embodiments, a method of operating a portable electronic apparatus may include determining whether the electronic device is located in a first geofence, starting monitoring of air pressure on the basis of partly at least the determining that the electronic device is located in the first geofence, deactivating at least one part of a communication module of the electronic device when the monitored air pressure satisfies a first range and/or a first change rate, and re-activating the at least one part of the communication module when the monitored air pressure satisfies a second range and/or a second change rate after the at least one part of the communication module is deactivated.

According to various example embodiments, the method may further include, after the at least one part of the communication module is re-activated, determining whether the electronic device is located in a second geofence, and stopping monitoring of air pressure measured on the basis of partly at least the determining that the electronic device exists in the second geofence.

According to various example embodiments, the method may further include providing a service related to the second geofence based on at least the determining that the electronic device is located in the second geofence.

According to various example embodiments, the service related to the second geofence may include at least one of a function operation related to the second geofence, an application operation, and a mode change.

According to various example embodiments, the deactivating of the at least one part of the communication module may include detecting an air pressure increase in a state in which the air pressure is constantly maintained, and if an air pressure decrease greater than or equal to a reference level is continuously detected during a reference time, deactivating at least one part of the communication module.

According to various example embodiments, the deactivating of the at least one part of the communication module may include deactivating at least one part of the communication module if an air pressure increase and an acceleration change greater than or equal to a reference level are detected in a state in which the air pressure is constantly maintained.

According to various example embodiments, the deactivating of the at least one part of the communication module may include deactivating the at least one part of the communication module if an acceleration change greater than or equal to a first reference is continuously detected in a state in which air pressure is constantly maintained and if an air pressure decrease greater than or equal to a second reference level is continuously detected.

According to various example embodiments, the deactivating of the at least one part of the communication module may include determining that the plane has taken off if an air pressure increase and an acceleration change greater than or equal to a reference level are detected in a state in which the air pressure is constantly maintained and if an air pressure decrease greater than or equal to a second reference level is continuously detected during a reference time.

According to various example embodiments, the re-activating of the at least one part of the communication module may include re-activating the at least one part of the communication module if an air pressure increase greater than or equal to a reference level is continuously detected during a reference time and an air pressure decrease is detected after the at least one part of the communication module is deactivated.

According to various example embodiments, the re-activating of the at least one part of the communication module may include re-activating the at least one part of the communication module if an air pressure increase greater than or equal to a first reference level is continuously detected during a reference time, an an acceleration change greater than or equal to a second reference size is detected through the sensor module, and a air pressure decrease is detected after the at least one part of the communication module is deactivated.

According to various example embodiments, the method may further include providing an in-flight service including in-flight service information when the monitored air pressure satisfies a first range and/or a first change rate. The in-flight service may include at least one of flight information, in-flight environment information, in-flight exercise information, information for guiding how to fill out an arrival card, in-flight safety guide information, and time difference information.

According to various example embodiments, the method may further include stopping radio signal scanning by using at least one part of a communication module of the electronic device when the monitored air pressure satisfies a first range and/or a first change rate.

According to various example embodiments, a method of operating an electronic device may include starting monitoring of air pressure measured by using the air pressure sensor, determining that a plane in which the electronic device is located has taken off when the monitored air pressure satisfies a first change rate, and determining that the plane has landed when the monitored air pressure satisfies a second change rate in a state in which it is determined that the plane has taken off.

According to various example embodiments, an electronic device and a method of recognizing its context determine a taking-off or landing state of a plane based on an in-flight air pressure change pattern measured by an air pressure sensor, thereby decreasing an incorrect state determination and automatically changing a configuration of at least one communication module.

According to various example embodiments, an electronic device and a method of recognizing its context provide an in-flight service including, for example, in-flight information, corresponding to a taking-off, landing, or in-flight state of a plane or a location-based service of a destination, thereby improving user convenience.

The term "module" as used herein may, for example, mean a unit including one of hardware circuitry, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a processor including processing circuitry, hardware circuitry, firmware, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. When an instruction is implemented by one or more processors (for example, the processor 120), one or more processors may execute a function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high level language codes, which can be executed in a computer by using an interpreter, as well as machine codes made by a compiler. Any of the hardware devices as described above may be configured to work as one or more software modules in order to perform the operations according to various example embodiments, and vice versa.

Any of the modules or programming modules according to various example embodiments may include at least one of the above described elements, exclude some of the elements, or further include other additional elements. The operations performed by the modules, programming module, or other elements according to various example embodiments may be executed in a sequential, parallel, repetitive, or heuristic manner. Further, some operations may be executed according to another order or may be omitted, or other operations may be added.

The example embodiments disclosed herein are provided to simply describe technical details of the present disclosure and to aid in the understanding of the present disclosure, and are not intended to limit the scope of various example embodiments of the present disclosure. Therefore, it should be construed that all modifications and changes or various other embodiments based on the technical idea of various example embodiments of the present disclosure fall within the scope of various example embodiments of the present disclosure.

What is claimed is:

1. An electronic device comprising:
    a communication module comprising communication circuitry;
    an air pressure sensor configured to measure air pressure;
    a processor comprising processing circuitry, the processor electrically coupled to the communication module and the air pressure sensor; and
    a memory electrically coupled to the processor,
    wherein the memory stores instructions that, when executed by the processor, cause the processor to:
        determine, using the communication module, whether the electronic device is located in a first geofence;
        in response to determining that the electronic device is located in the first geofence, monitor air pressure using the air pressure sensor;
        deactivate the communication module in response to detecting that the air pressure is temporarily increased and the air pressure is continuously decreased after the air pressure is temporarily increased during a first reference time;
        provide in-flight service information in response to detecting that the air pressure is constantly maintained after the air pressure is continuously decreased during a second reference time;
        re-activate the deactivated communication module in response to detecting that the air pressure is continuously increased and the air pressure is temporarily decreased after the air pressure is continuously increased during a third reference time;
        determine, using the communication module, whether the electronic device is located in a second geofence different from the first geofence;
        receive, via the communication module, data regarding a service related to the second geofence, in response to determining that the electronic device is located in the second geofence; and
        provide, based on the received data, the service related to the second geofence, wherein the service related to the second geofence includes a guide on an immigration procedure for a user of the electronic device.

2. The electronic device of claim 1, wherein the instructions further cause the processor to:
    stop monitoring of air pressure using the air pressure sensor, in response to determining that the electronic device is located in the second geofence.

3. The electronic device of claim 1, wherein the service related to the second geofence comprises one or more of: a function operation related to the second geofence, an application operation, and a mode change.

4. The electronic device of claim 1, further comprising at least one sensor for detecting motion of the electronic device,
    wherein the instructions further cause the processor to deactivate the communication module when an acceleration change greater than or equal to a reference level are detected.

5. The electronic device of claim 1, further comprising at least one sensor for detecting motion of the electronic device,
    wherein the instructions further cause the processor to re-activate the deactivated communication module when an acceleration change greater than or equal to a second reference level is detected through the at least one sensor after the communication module is deactivated.

6. The electronic device of claim 1, wherein the instructions further cause the processor to:
    determine that a plane in which the electronic device is located has taken off when the air pressure is temporarily increased and air pressure is continuously decreased after the air pressure is temporarily increased; and determine that the plane in which the electronic device is located has landed when the air pressure is continuously increased and the air pressure is temporarily decreased after the air pressure is continuously increased.

7. The electronic device of claim 1, wherein the instructions further cause the processor to:

in response to determining that the electronic device is located in the first geofence, provide a service related to the first geofence, wherein the service related to the first geofence includes at least one of a guidance of a ticketing location, a guidance of airport facilities, or a guidance of a boarding gate.

8. The electronic device of claim 1, wherein the in-flight service information includes at least one of an airline of a plane boarded by the user, a type of the plane, a seat class of the user, a seat position of the user, an air route of the plane, recommended exercises, an amount of exercises of the user, in-flight environment information of the plane, or in-flight entertainment information of the plane.

9. The electronic device of claim 1, wherein the service related to the second geofence further includes at least one of local weather information, a guide to a place for immigration formalities, or tourist attraction information.

10. A method of operating an electronic device, the method comprising:

determining whether the electronic device is located in a first geofence;

in response to determining that the electronic device is located in the first geofence, monitoring air pressure using an air pressure sensor;

deactivating a communication module of the electronic device in response to detecting that the air pressure is temporarily increased during a first reference time and the air pressure is continuously decreased after the air pressure is temporarily increased;

providing in-flight service information in response to detecting that the air pressure is constantly maintained after the air pressure is continuously decreased during a second reference time;

re-activating the deactivated communication module in response to detecting that the air pressure is continuously increased and the air pressure is temporarily decreased after the air pressure is continuously increased during a third reference time;

determining whether the electronic device is located in a second geofence different form the first geofence;

receiving data regarding a service related to the second geofence, in response to determining that the electronic device is located in the second geofence; and providing, based on the received data, the service related to the second geofence, wherein the service related to the second geofence includes a guide on an immigration procedure for a user of the electronic device.

11. The method of claim 10, further comprising:

stopping monitoring of air pressure in response to determining that the electronic device is located in the second geofence.

12. The method of claim 10, wherein the service related to the second geofence comprises one or more of: a function operation related to the second geofence, an application operation, and a mode change.

13. The method of claim 10, wherein the deactivating of the communication module further comprises deactivating the communication module when an acceleration change greater than or equal to a reference level are detected.

14. The method of claim 10, wherein the re-activating of the deactivated communication module comprises re-activating the deactivated communication module when an acceleration change greater than or equal to a second reference level is detected after the communication module is deactivated.

* * * * *